(12) United States Patent
Core

(10) Patent No.: US 6,782,211 B1
(45) Date of Patent: Aug. 24, 2004

(54) CROSS POLARIZATION INTERFACE CANCELER

(76) Inventor: Mark T. Core, 738 Royal Stewart Dr., Placentia, CA (US) 92870

( * ) Notice: Subject to any disclaimer, the term of this patent is extended or adjusted under 35 U.S.C. 154(b) by 0 days.

(21) Appl. No.: 09/434,213

(22) Filed: Nov. 4, 1999

Related U.S. Application Data

(60) Provisional application No. 60/107,123, filed on Nov. 5, 1998.

(51) Int. Cl.[7] .............................................. H04B 10/00
(52) U.S. Cl. ...................... 398/205; 398/204; 398/207
(58) Field of Search ............................... 359/192, 122, 359/190, 142, 193; 398/202, 204, 205, 208, 65

(56) References Cited

U.S. PATENT DOCUMENTS

| | | | | |
|---|---|---|---|---|
| 3,752,992 A | * | 8/1973 | Fluhr ........................... | 398/65 |
| 3,971,930 A | * | 7/1976 | Fitzmaurice et al. ........ | 398/213 |
| 4,718,120 A | * | 1/1988 | Tzeng ......................... | 398/204 |
| 4,856,093 A | * | 8/1989 | Mohr .......................... | 398/204 |
| 5,003,626 A | * | 3/1991 | Kuwahara et al. .......... | 398/204 |
| 5,023,948 A | * | 6/1991 | Smith ......................... | 398/185 |
| 5,111,322 A | * | 5/1992 | Bergano et al. ............. | 398/74 |
| 5,323,258 A | * | 6/1994 | Tsushima et al. ........... | 398/203 |
| 5,388,088 A | * | 2/1995 | Gans et al. .................. | 398/65 |
| 5,608,560 A | * | 3/1997 | Abram et al. ............... | 398/185 |
| 5,742,418 A | * | 4/1998 | Mizutani et al. ............ | 398/184 |
| 5,844,950 A | * | 12/1998 | Aono et al. ................. | 375/229 |
| 6,310,707 B1 | * | 10/2001 | Kawase et al. ............. | 398/119 |
| 6,492,800 B1 | * | 12/2002 | Woods et al. ............... | 324/96 |

OTHER PUBLICATIONS

"Cross Polarization Interference Canceller for QAM Digital Radio Systems W/Asynchronous Clock and Carrier Signals;" B. Lanki, Transmission Systems, Radio Relay Design pp. 0523/9.

"Design of a Terrestrial Cross POL Canceler," Michael L. Steinberger, Bell Laboratories, Holmdel, NJ 07733, pp. 2B.6.1–2B.6.5.

"An IF Cross–Pol Canceller for Microwave Radio Systems," James W. Carlin et al., IEEE Journal on Selected Areas in Communications, vol. SAC–5, No. 3, 4/87, pp. 502–514.

"Polarization–State Control Schemes for Heterodyne or Homodyne Optical Fiber Communications," T. Okoshi, IEEE, Journal of Lightwave Tech., vol. LT–3, No. 6, 12/85.

"Electrooptic Guided–Wave Device for General Polarization Transformations," R.C. Alferness, IEEE Journal of Quantum Electronics, vol. QE–17, No. 6, 6/81, pp. 965–969.

"Equivariant Adaptive Source Separation," Jean–Francois Cardoso, IEEE Transactions on Signal Processing, vol. 44, No. 12, 12/96, pp. 3017–3030.

"On Blind Beamforming for Multiple Non–Gaussian Signals and the Constant–Modulus Algorithm," J. Sheinvald, IEEE Transactions on Signaling Processing, vol. 45, No. 7, 7/98.

"An Efficient Technique for the Blind Separation of Complex Sources," Jean–Francois Cardoso et al., 1993 IEEE, pp. 275–279.

(List continued on next page.)

*Primary Examiner*—Jason Chan
*Assistant Examiner*—Agustin Bello
(74) *Attorney, Agent, or Firm*—Blakely Sokoloff Taylor & Zafman LLP

(57) ABSTRACT

Implemented in both coherent and non-coherent optical systems, a receiving device including a cross polarization interference canceler (XPIC) is described. For these embodiments, the XPIC optimizes bandwidth efficiency of an optical communication link by enabling the reconstruction of two optical signals transmitted with generally orthogonal polarization states and routed over a single fiber optic transmission medium in the same frequency band.

37 Claims, 7 Drawing Sheets

OTHER PUBLICATIONS

"Moment Characterization of Phase Noise in Coherent Optical Systems," G.L. Pierobon, IEEE Journal of Lightwave Technology, vol. 9, No. 8, 8/91, pp. 996–1005.

"The Statistical Properties of Phase Noise," D.J. Bond, BR Telecom Technol J vol. 7 No. 4 10/89, pp. 12–17.

"Characterizing Filtered Light Waves Corrupted by Phase Noise," G.J. Foschini et al., IEEE Transactions on Information Theory, vol. 34, No. 6, 11/88, pp. 1437–1448.

"Modulation and Detection Characteristics of Optical Continuous Phase FSK Transmission System," K. Iwashita, IEEE Journal of Lightwave Technology, vol. LT–5, No. 4, 4/87.

"The Effect of Crosstalk and Phase Noise in Multichannel Coherent Optical DPSK Systems With Tight IF Filtering," G. Jacobsen et al., IEEE Journal of Lightwave Technology, vol. 9, No. 11, 11/91, pp. 1609–1617.

"A Dual–Detector Optical Heterodyne Receiver for Local Oscillator Noise Suppression," G. L. Abbas et al., IEEE Journal of Lightwave Technology, vol. LT–3, No. 5, 10/85, pp. 1110–1122.

"Preservation of Polarisation Orthogonality Through a Linear Optical System," Electronics Letters 3rd Dec. 1987, vol. 23, No. 25, pp. 1365–1366.

"First Heterodyne Receiver Frontend Module Including a Polarization Diversity Receiver OEIC on InP," M. Hamacher et al., IEEE Photonics Technology Letters, vol. 7, No. 2, 2/95.

"Polarization Control for Coherent Fiber–Optic Systems Using Nematic Liquid Crystals," S.H. Rumbaugh, IEEE Journal of Lightwave Technology, vol. 8, No. 3, 3/90, pp. 459–465.

"Fast Automatic Polarization Control System," F. Heismann et al., IEEE Photonics Technology Letters, vol. 4, No. 5, 5/92, pp. 503–505.

"Modulation and Demodulation Techniques in Optical Heterodyne PSK Transmission Systems," T. Chikama et al., IEEE Journal of Lightwave Technology, vol. 8, No. 3, 3/90.

"Polarization Independent Coherent Optical Receiver," B. Glance, IEEE Journal of Lightwave Technology, vol. LT–5, No. 2, 2/87, pp. 274–276.

"Polarization Fluctuations in a Single–Mode Optical Fiber," T. Imai et al., IEEE Journal of Lightwave Technology, vol. 6, No. 9, 9/88, pp. 1366–1375.

Polarisation Stability in Long Lengths of Monomode Fibre, Electronics Letters 25th Nov. 1982, vol. 18, No. 24, pp. 1058–1059.

"Phase Noise and Polarization State Insensitive Optical Coherent Systems," S. Betti et al., IEEE Journal of Lightwave Technology, vol. 8, No. 5, 5/90, pp. 756–767.

* cited by examiner

CROSS POLARIZATION INTERFACE CANCELER

CROSS-REFERENCES TO RELATED APPLICATIONS

This application claims the benefit of U.S. Provisional Patent Application No. 60/107,123 filed Nov. 5, 1998.

BACKGROUND

1. Field

The present invention relates to the field of fiber optics. In particular, the present invention constitutes a cross-polarization interference canceler (XPIC) and its corresponding method of operation that optimizes bandwidth efficiency over an optical fiber transmission medium and mitigates dispersion effects or any loss of optical field orthogonality incurred during propagation through the optical fiber.

2. Related Art

Due to increased demand for fast data transmissions, optical communication networks are being utilized more frequently. Normally, a fiber optic communication link includes a set of transceivers coupled together by optical fiber supporting one or more fiber optic transmission channels. Each transceiver includes a transmitter and receiver. The transmitter converts an electrical signal to a single optical signal, which is applied to a fiber optic transmission medium. The receiver converts the optical signal back to an electrical signal, which may be routed through electrical wire or processed by a computer for example.

Typically, the electric field of the received optical signal has time varying polarization, and the optical receiver must either be insensitive to the field polarization, or track the optical field polarization to recovery the transmitted information.

Referring to FIG. 1, a block diagram of a conventional coherent fiber optic communication link utilizing a polarization diversity receiver 100 is shown. This type of receiver is insensitive to the polarization of the received optical signal field. Receiver 100 includes a pair of polarization beam splitters 110 and 120. A first polarization beam splitter 110 receives an, incoming optical signal from the optical fiber. This incoming optical signal comprises an electromagnetic (EM) plane wave with an electric field 130 (referred to as "$\underline{\epsilon}_S(t)$") that is amplitude and/or phase modulated with information bearing in-phase (I(t)) and quadrature (Q(t)) waveforms.

For clarity sake, the horizontal ($\hat{x}$) and vertical ($\hat{y}$) directions are defined to coincide with the polarization axes of the polarization beam splitters at receiver 100. The polarization states of the transmitted electric field (referred to as "$\underline{\epsilon}_T(t)$") and received electric field ($\underline{\epsilon}_S(t)$) 130 are assumed arbitrary with respect to the $\hat{x}$ and $\hat{y}$ directions.

Polarization beam splitter 110 separates received electric field $\underline{\epsilon}_S(t)$ 130 into a horizontal ($\hat{x}$) field component and a vertical ($\hat{y}$) field component. These $\hat{x}$ and $\hat{y}$ components of $\underline{\epsilon}_S(t)$ 130 are routed into double-balanced optical receivers (DBORs) 140 and 150. Polarization beam splitter 120 receives an optical signal from a local oscillator (LO) laser, in particular a non-modulated EM plane wave with an electric field ($\underline{\epsilon}_L(t)$) 135. A "DBOR" is a device that performs the function of an optical mixer, multiplying the optical inputs and removing the resulting high frequency components through the inherent bandlimiting of the photodiodes. This multiplication process is polarization sensitive, however, and only the component of $\underline{\epsilon}_S(t)$ 130 with the same polarization as $\underline{\epsilon}_L(t)$ 135 is detected.

The frequency of the LO laser is adjusted such that the difference between the optical LO frequency and the carrier frequency of $\underline{\epsilon}_S(t)$ is equal to the desired intermediate carrier frequency $\omega_{IF}$ of the DBOR output current. A demodulator 170 then demodulates the IF signal and recovers the baseband information bearing waveforms I(t) and Q(t).

More specifically, the $\hat{x}$ component of $\underline{\epsilon}_S(t)$ is routed to DBOR 140 and the $\hat{y}$ component is routed to DBOR 150. Each DBOR 140 or 150 includes, for example, a directional coupler and photodiodes connected in series. The $\hat{x}$ component of $\underline{\epsilon}_L(t)$ is also routed to DBOR 140 and the $\hat{y}$ component is routed to DBOR 150. If the polarization state of $\underline{\epsilon}_L(t)$ is adjusted to be linearly polarized at forty-five (45) degrees with respect to the $\hat{x}$ axis, then DBOR 140 will respond with an electrical current (referred to as "$i_1(t)$") having a magnitude that is proportional to the $\hat{x}$ component of $\underline{\epsilon}_S(t)$ 130, and DBOR 150 will respond with a current (referred to as "$i_2(t)$") having a magnitude that is proportional to the $\hat{y}$ component of $\underline{\epsilon}_S(t)$ 130 and having the same phase as $i_1(t)$.

The output electrical currents of DBORs 140 and 150 are combined to produce a resultant electrical signal current 160 (referred to as "$i_3(t)$"). Thus, since any polarization state can be resolved into $\hat{x}$ and $\hat{y}$ components, polarization diversity receiver 100 will respond to a received optical signal field with arbitrary polarization. Although polarization diversity receiver 100 is able to detect a received optical signal field with arbitrary polarization, it fails to take advantage of the potential to transmit independent optical signals across the optical medium in the same frequency band, but with orthogonal polarization states, and thereby increase the link bandwidth efficiency.

Under ideal conditions, two conventional polarization tracking receivers (not shown) could reconstruct two received optical signals having fields with orthogonal polarization states by tracking the polarization of each signal field. Theoretically, if the polarization of the optical LO in each receiver is adjusted to match the polarization of the electric field of one of the optical signals, then the other optical signal will be rejected. However, in practice, the orthogonality of the two optical signal fields would be lost to some extent during propagation through the optical fiber. Therefore, a system having two conventional polarization tracking receivers would incur a signal crosstalk penalty, also known as cross polarization interference (XPI). This would have adverse effects on the quality and reliability of the optical signaling.

Besides cross polarization interference, the optical signal may experience chromatic and/or polarization mode dispersion. In general, dispersion is problematic when a light pulse, normally associated with a particular period of time, begins to occupy portions of the time period associated with adjacent light pulses. A solution to overcome dispersion involves reducing the transmission length of the optical fiber. One way to reduce the transmission length is to place regenerative repeaters at selected intervals of the optical fiber. Regenerators require signal detection, electrical clock recovery circuitry, and means of generating a new optical signal from the recovered electrical signal. The use of repeaters, therefore, significantly increases the construction costs for an optical communication network.

It would therefore be desirable to develop a cross-polarization interference canceler (XPIC) and a method that optimizes bandwidth efficiency over the optical fiber by enabling two optical signals transmitted in the same frequency band but with orthogonal polarization to be recovered at the receiver. This could correct for dispersion effects or any loss of optical field orthogonality incurred during propagation through the optical fiber, and optimally reconstruct the information bearing modulation waveforms at the receiver.

SUMMARY

As described herein, implemented in both coherent and non-coherent optical systems, exemplary embodiments of a receiving device including a cross polarization interference canceler (XPIC) are shown. For each of these embodiments, the XPIC optimizes bandwidth efficiency of an optical link by enabling the reconstruction of two optical signals transmitted with generally orthogonal polarization states and routed over a single fiber optic transmission medium in the same frequency band.

BRIEF DESCRIPTION OF THE DRAWINGS

The features and advantages of the present invention will become apparent from the following detailed description of the present invention in which.

DETAILED DESCRIPTION

Certain embodiments of the invention are described to provide a cross polarization interference canceler that optimizes bandwidth efficiency of an optical link by enabling the reconstruction of two optical signals transmitted with generally orthogonal polarization states and routed over a single fiber optic transmission medium in the same frequency band. The cross polarization interference canceler (XPIC) may also be directed to mitigate the effects of chromatic and/or polarization mode dispersion that currently limit the performance of high data rate optical communication networks.

Herein, various examples of circuitry and methods of operation are described. These examples should broadly be construed as illustrative in nature in order to represent the spirit of the invention. Also, certain terminology is used to describe various embodiments of the link. For example, a "signal" is a detectable physical quantity used to convey information for operating or controlling a device. There exist a variety of signal types, including optical, electrical and the like. A "device" is hardware and/or software operating to process, transmit and/or receive signals. Examples of a device include a computer, a router, a bridge, a modem and the like. A "cross polarization interference canceler" (XPIC) is circuitry and/or software designed to at least improve bandwidth efficiency of a fiber optic communication link by reconstructing two optical signals that are transmitted with generally orthogonal polarization states.

Because cross polarization interference cancellation is a form of coherent signal processing, the XPIC must be implemented optically for direct detection fiber optic systems. This is because all phase information is lost in the optical-to-electrical conversion process of direct detection receivers. Since phase information is retained during optical-to-electrical conversion in a coherent receiver, XPIC can be implemented either optically or electrically in coherent systems. In the context of optical communications, the term "coherent" refers to the use of a receiver with an optical local oscillator (LO) that translates the received optical signal from optical frequencies to either baseband (homodyne detection) or to an intermediate frequency (heterodyne detection).

Figure 3:
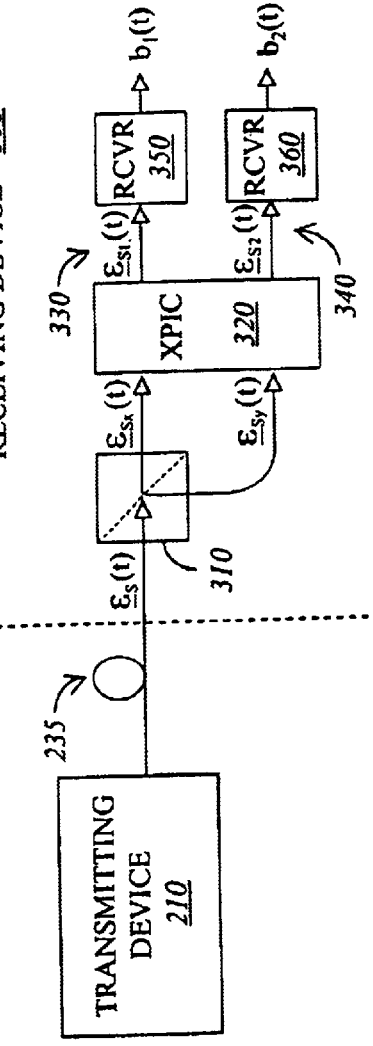
FIG. 3 is an exemplary embodiment of an intensity modulation direct detection (IM-DD) fiber optic link having a receiving device utilizing an optical XPIC 320.
Figure 5:
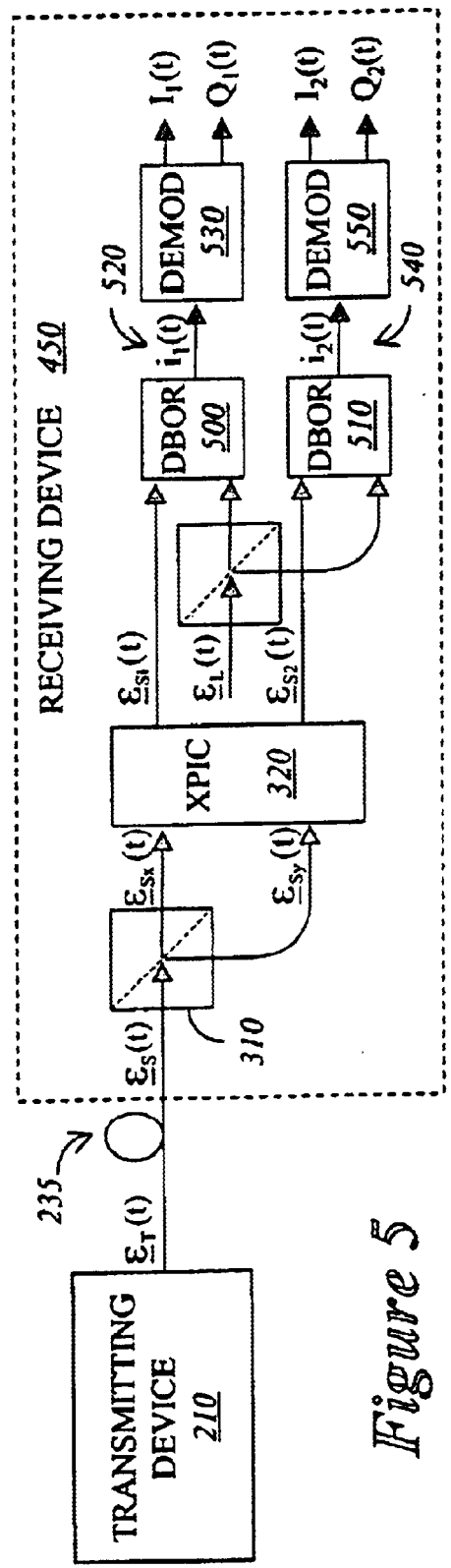
FIG. 5 is an exemplary implementation of a coherent fiber optic link having a receiving device utilizing an optical XPIC.
Figure 9:
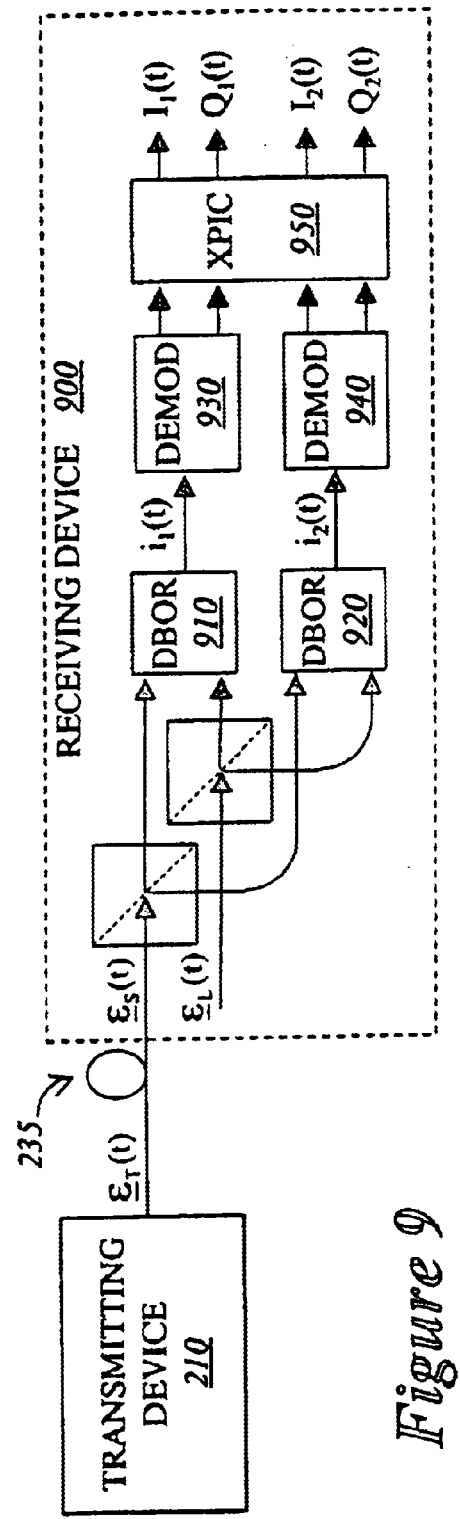
FIG. 9 is an exemplary embodiment of a coherent fiber optic link having a receiving device utilizing a baseband XPIC.
Figure 6:
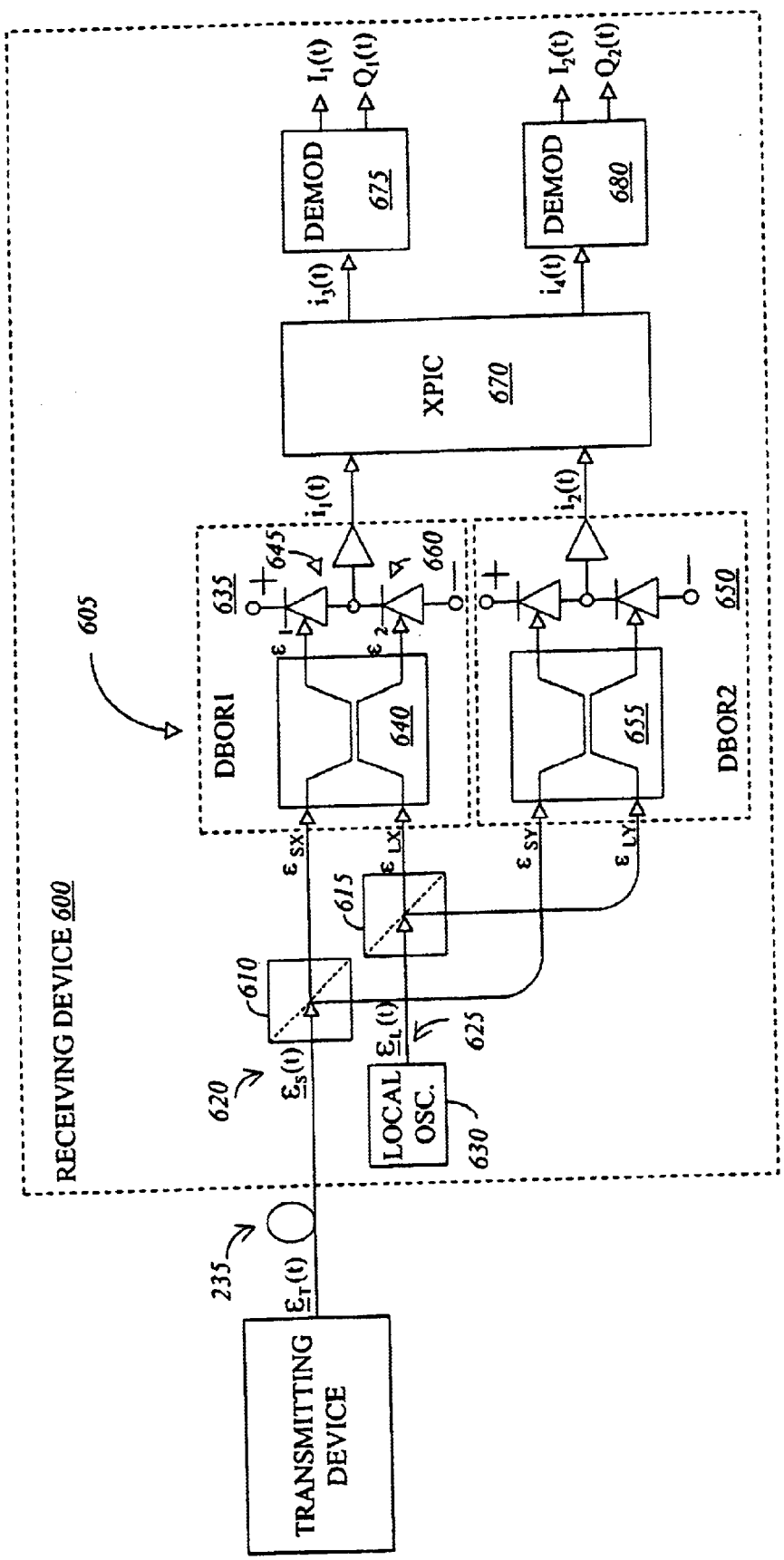
FIG. 6 is an exemplary implementation of a coherent fiber optic link having a receiving device utilizing an IF XPIC.

Herein, four exemplary implementations of optical links employing a cross polarization interference canceler are shown. In particular, FIG. 3 illustrates an exemplary implementation for an intensity modulation direct detection (IM-DD) fiber optic system using an optical XPIC; FIG. 5 illustrates an exemplary implementation of a coherent receiving device utilizing an optical XPIC; FIG. 6 illustrates an exemplary implementation of a coherent receiving device utilizing an electrical IF XPIC; and FIG. 9 illustrates an exemplary implementation of a coherent receiving device utilizing an electrical baseband XPIC.

A. Transmit Signal Generation

Figure 1:
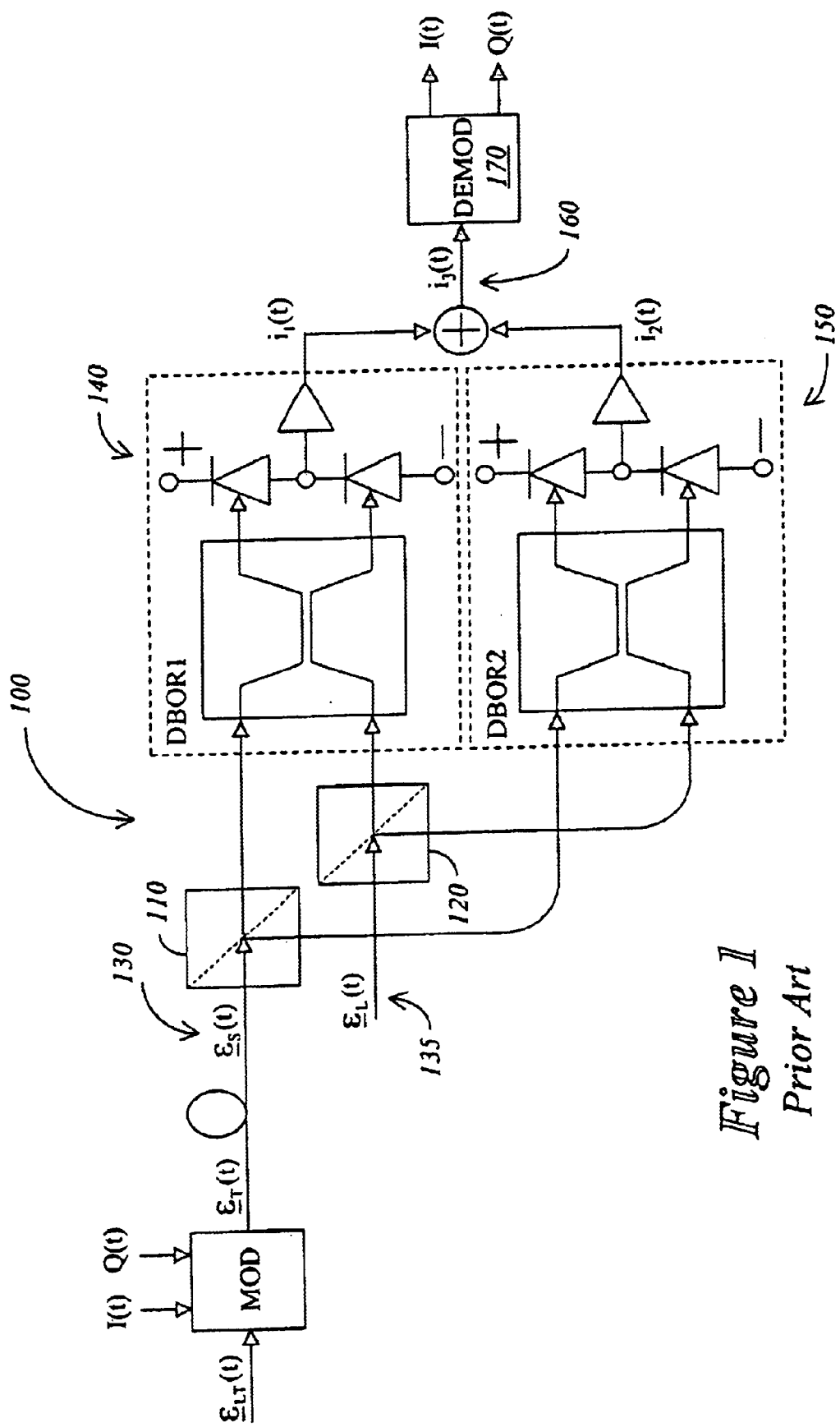
FIG. 1 is a block diagram of a conventional coherent fiber optic communication link utilizing a polarization diversity receiver 100.
Figure 2:
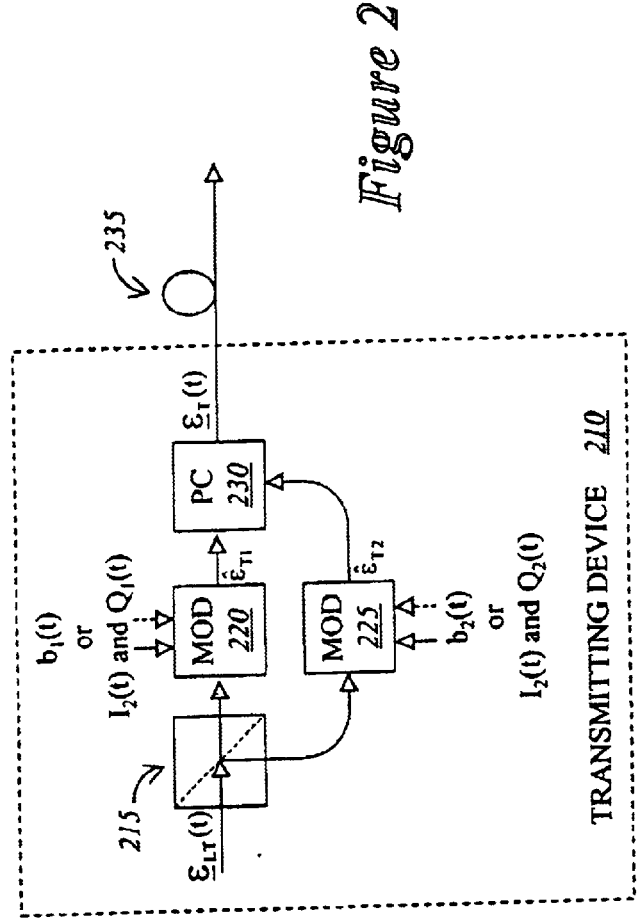
FIG. 2 is an exemplary embodiment of a transmitting device capable of being utilized by either non-coherent or coherent systems.

Referring now to FIG. 2, an exemplary embodiment of a transmitting device capable of being utilized by any of the exemplary embodiments of FIGS. 3, 5, 6 and 9 is shown. In one embodiment, the transmitting device is configured to separate the electric field $\epsilon_{LT}(t)$ of the local oscillator beam into two orthogonally polarized field components. Each field component is independently modulated with information bearing waveforms to produce two modulated optical signals having electric fields $\epsilon_{T1}(t)$ and $\epsilon_{T2}(t)$. The two modulated optical signals with orthogonally polarized electric fields are recombined before transmission over the optical fiber.

As shown, transmitting device 210 includes of a local oscillator (LO) laser having an electric field denoted by $\underline{\epsilon}_{LT}(t)$. In this embodiment, the polarization state of the local oscillator is adjusted so that the LO power is equally divided by a polarization beam splitter 215 into orthogonally polarized components. Again, the horizontal ($\hat{x}$) and vertical ($\hat{y}$) directions are defined to coincide with the polarization axes of one or more polarization beam splitters at a receiving device. For generality, the polarization axes of polarization beam esplitter 215 are assumed to have an arbitrary orientation with respect to the $\hat{x}$ and $\hat{y}$ directions.

The outputs from polarization beam splitter 215 are individually modulated with independent information bearing waveforms by modulators 220 and 225. In the case of coherent modulation formats, in-phase ($I_k(t)$) and quadrature ($Q_k(t)$) waveforms may be used for arbitrary amplitude and/or phase modulation. In the case of intensity modulation, however, a single waveform $b_k(t)$ may be used by modulators 220 and 225. The resulting modulated optical signals having fields $\underline{\epsilon}_{T1}(t)$ and $\underline{\epsilon}_{T2}(t)$ are recombined using a polarization combiner 230. Polarization combiner 230 produces a transmit optical signal to be routed over an optical fiber transmission medium 235.

Suppressing the $\hat{z}$ dependence and the radial field distribution, and neglecting noise, the simplified expression for the electric field of the transmitted optical signal, namely $\underline{\epsilon}_T(t)$, when applied to optical fiber transmission medium 235 is defined in equation (A.1), where $$\underline{\epsilon}_T(t) = Re\{([\epsilon_{Tx1}e^{j\delta Tx1}v_1(t) + \epsilon_{Tx2}e^{j\delta Tx2}v_2(t)]\hat{x} + [\epsilon_{Ty1}e^{j\delta Ty1}v_1(t) + \epsilon_{Ty2}e^{j\delta Ty2}v_2(t)]\hat{y})e^{j\omega_S t + j\phi_S(t)}\}. \quad (A.1)$$

The term "$\phi_S(t)$" denotes the phase noise of the LO laser of transmitting device 210 and "$v_1(t)$" and "$v_2(t)$" are the complex envelope representations of the modulating functions $$v_k(t) = a_k(t)e^{j\theta_k(t)} = I_k(t) + jQ_k(t) \quad k=1,2. \quad (A.2)$$

For intensity modulation, $v(t)$ is real and has the form $$v_k(t) = b_k(t) \quad k=1,2. \quad (A.3)$$

The polarization states of the independently modulated, electric field components may be specified by their respective Jones vector as set forth in equations (A.4) and (A.5) below.

$$\hat{\epsilon}_{T1} = \begin{bmatrix} \epsilon_{Tx1}e^{j\delta Tx1} \\ \epsilon_{Ty1}e^{j\delta Ty1} \end{bmatrix} \quad (A.4)$$

$$\hat{\epsilon}_{T2} = \begin{bmatrix} \epsilon_{Tx2}e^{j\delta Tx2} \\ \epsilon_{Ty2}e^{j\delta Ty2} \end{bmatrix}. \quad (A.5)$$

From these Jones vectors, a matrix (U) may be created with columns consistent with the Jones vectors of the two modulated field components as shown in equation (A.6).

$$U = \begin{bmatrix} \epsilon_{Tx1}e^{j\delta Tx1} & \epsilon_{Tx2}e^{j\delta Tx2} \\ \epsilon_{Ty1}e^{j\delta Ty1} & \epsilon_{Ty2}e^{j\delta Ty2} \end{bmatrix}. \quad (A.6)$$

Because the polarization state of the transmit LO laser is adjusted such that the optical power is equally divided by polarization beam splitter 215 in this embodiment, and because splitter 215 divides the local oscillator field into orthogonally polarized components, the columns of matrix U are orthogonal, and matrix U is therefore proportional to a unitary matrix.

The angle between any two polarization states specified by Jones vectors $\hat{\epsilon}_{S1}$ and $\hat{\epsilon}_{S2}$ is defined by equation (A.7).

$$\gamma = \cos^{-1}\left(\sqrt{\frac{|\hat{\epsilon}_{S1}^H \hat{\epsilon}_{S2}|^2}{\hat{\epsilon}_{S1}^H \hat{\epsilon}_{S1} \hat{\epsilon}_{S2}^H \hat{\epsilon}_{S2}}}\right), \quad (A.7)$$

where the terms "$\hat{\epsilon}_{S1}$" and "$\hat{\epsilon}_{S2}$" denote Jones vectors and the superscript "H" denotes the conjugate transpose of that vector.

B. Effect of the Optical Fiber Transmission Medium

If the optical signal is sufficiently narrowband then the transfer function of the optical medium will exhibit no frequency dependence over the bandwidth of the signal. When this assumption holds, the effect of the fiber optic medium 235 on the matrix (U) of Jones vectors for the transmitted optical fields can be represented as $$V = TU, \quad (B.1)$$

where "T" is a complex 2×2 fiber transmission matrix that accounts for the effect of the fiber optic medium 235 on the transmitted signal polarizations, and "V" is a matrix with columns corresponding to the Jones vectors of the received optical fields as shown in equation (B.2).

$$V = \begin{bmatrix} \epsilon_{Sx1}e^{j\delta Sx1} & \epsilon_{Sx2}e^{j\delta Sx2} \\ \epsilon_{Sy1}e^{j\delta Sy1} & \epsilon_{Sy2}e^{j\delta Sy2} \end{bmatrix}. \quad (B.2)$$

When the symbol rate exceeds a few gigahertz (GHz), this narrowband approximation is no longer valid for standard single mode fiber, and the optical medium exhibits significant distortion in the form of chromatic and polarization mode dispersion. In this case, the matrix of Jones vectors for the received optical fields is expressed as $$V(\omega) = T(\omega)U, \quad (B.3)$$

where "$T(\omega)$" is a 2×2 frequency dependent complex transmission matrix for the fiber optic medium. Therefore, when the fiber transmission matrix (T) is frequency dependent, the Jones vectors of the received optical fields are also frequency dependent, and the matrix $V(\omega)$ has the following form:

$$V(\omega) = \begin{bmatrix} \epsilon_{Sx1}(\omega)e^{j\delta Sx1(\omega)} & \epsilon_{Sx2}(\omega)e^{j\delta Sx2(\omega)} \\ \epsilon_{Sy1}(\omega)e^{j\delta Sy1(\omega)} & \epsilon_{Sy2}(\omega)e^{j\delta Sy2(\omega)} \end{bmatrix}. \quad (B.4)$$

In the absence of polarization dependent loss, $T(\omega)$ is a unitary matrix, but in general the fiber transmission matrix is not unitary.

C. Optical XPIC for IM-DD Systems

For IM-DD systems implemented with the present invention, a receiving device would split the received optical signal having an electric field $\underline{\epsilon}_S(t)$ into two orthogonally polarized components $\underline{\epsilon}_{Sx}(t)$ and $\underline{\epsilon}_{Sy}(t)$. These components would be applied as inputs to an optical XPIC, which would perform complex filtering or weighting and subsequent recombining of these inputs to mitigate cross polarization interference (XPI). Namely, each output of the XPIC is an optical signal with an electric field that has significant intensity modulation from only one of the originally transmitted signals. IM-DD receivers would accept the outputs of the XPIC and produce corresponding electrical signals.

Referring to FIG. 3, an illustrative embodiment of a link having a receiving device 300 utilizing an optical XPIC 320 is shown. If the $\hat{x}$ and $\hat{y}$ directions are defined to coincide with the polarization axes of the polarization beam splitters in the receiver, then the polarization beam splitter 310 acts on the received optical signal by separating the optical field into $\hat{x}$ and $\hat{y}$ components. The separated field components are processed by an optical XPIC 320, and the outputs of the XPIC are routed to standard intensity modulation direct detection (IM-DD) fiber optic receivers.

For the special case where the fiber transmission matrix (T) exhibits no frequency dependence, the outputs of polarization beam splitter 310 include two optical signal components with electric fields that can be expressed in matrix form as shown in equation (C.1)

$$\begin{bmatrix} \varepsilon_{Sx}(t) \\ \varepsilon_{Sy}(t) \end{bmatrix} = Re\left\{ \begin{bmatrix} \hat{x} & 0 \\ 0 & \hat{y} \end{bmatrix} \left( V \begin{bmatrix} s_1(t) \\ s_2(t) \end{bmatrix} + \begin{bmatrix} n_1(t) \\ n_2(t) \end{bmatrix} \right) \right\} \quad (C.1)$$

where "$s_1(t)$" and "$s_2(t)$" are the complex representations of the optical signals $$s_k(t) = v_k(t) e^{j\omega_s t + \phi_s(t)} \, k=1,2 \quad (C.2)$$

and "$n_1(t)$" and "$n_2(t)$" are independent complex white Gaussian noise processes resulting from the amplified spontaneous emission (ASE) of the optical amplifiers in the fiber optic medium. The one-sided power spectral density of the ASE produced by each optical amplifier in each polarization is given by $$N_{ASE} = (G-1) n_{sp} h\nu \quad (C.3)$$

where "G" is the amplifier gain, "$n_{sp}$" is the excess spontaneous emission factor related to the amplifier noise figure, and "$h\nu$" is photon energy.

For the general case of a frequency dependent fiber transmission matrix $T(\omega)$, the outputs of polarization beam splitter 310 are given by $$\begin{bmatrix} \varepsilon_{Sx}(t) \\ \varepsilon_{Sy}(t) \end{bmatrix} = Re\left\{ \begin{bmatrix} \hat{x} & 0 \\ 0 & \hat{y} \end{bmatrix} \left( F^{-1}\{V(\omega)\} * \begin{bmatrix} s_1(t) \\ s_2(t) \end{bmatrix} + \begin{bmatrix} n_1(t) \\ n_2(t) \end{bmatrix} \right) \right\}, \quad (C.4)$$

or equivalently $$\begin{bmatrix} \varepsilon_{Sx}(t) \\ \varepsilon_{Sy}(t) \end{bmatrix} = Re\left\{ \begin{bmatrix} \hat{x} & 0 \\ 0 & \hat{y} \end{bmatrix} \left( F^{-1}\{T(\omega)\} * U \begin{bmatrix} s_1(t) \\ s_2(t) \end{bmatrix} + \begin{bmatrix} n_1(t) \\ n_2(t) \end{bmatrix} \right) \right\}, \quad (C.5)$$

where $F^{-1}\{\cdot\}$ denotes the inverse Fourier transform and * indicates the convolution operator.

1. Diagonalizer XPIC Signal Reconstruction

Provided that optical fiber transmission medium 235 is not perfectly polarizing, the fiber transmission matrix $T(\omega)$ is nonsingular and the inverse $T^{-1}(\omega)$ will exist. The form of XPIC 320 that will diagonalize the overall link transmission matrix (e.g., $W(\omega) V(\omega)$) and eliminate all cross polarization interference and dispersion effects has a transfer function matrix $W(\omega)$) proportional to $V^{-1}(\omega)$ and is therefore represented by equation (C.6) as follows:

$$W(\omega) = \frac{\sqrt{P_S}}{P_T} U^H T^{-1}(\omega) = \begin{bmatrix} w_{11}(\omega) & w_{21}(\omega) \\ w_{12}(\omega) & w_{22}(\omega) \end{bmatrix} \quad (C.6)$$

where the superscript "H" denotes the conjugate transpose of that vector, "$P_T$" is the average transmitted optical power, and "$P_S$" is the average received optical power $$P_T = \frac{1}{2}(\varepsilon_{Tx1}^2 + \varepsilon_{Ty1}^2 + \varepsilon_{Tx2}^2 + \varepsilon_{Ty2}^2) \quad (C.7)$$

$$P_S = \frac{1}{2}(\varepsilon_{Sx1}^2 + \varepsilon_{Sy1}^2 + \varepsilon_{Sx2}^2 + \varepsilon_{Sy2}^2). \quad (C.8)$$

Figure 4B:
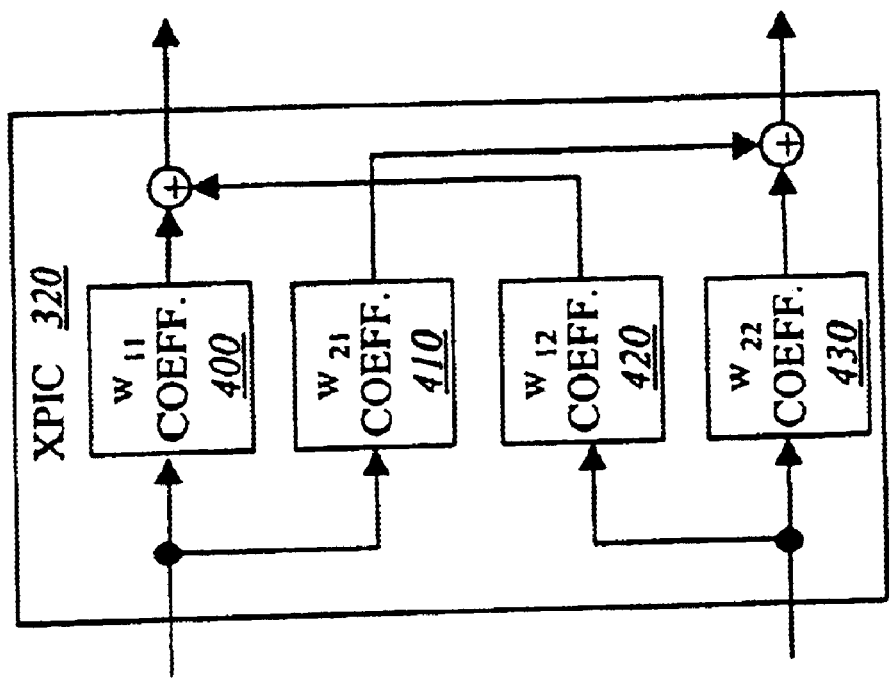
FIG. 4B is an exemplary embodiment of a frequency independent, optical XPIC comprised of four complex elements.
Figure 4A:
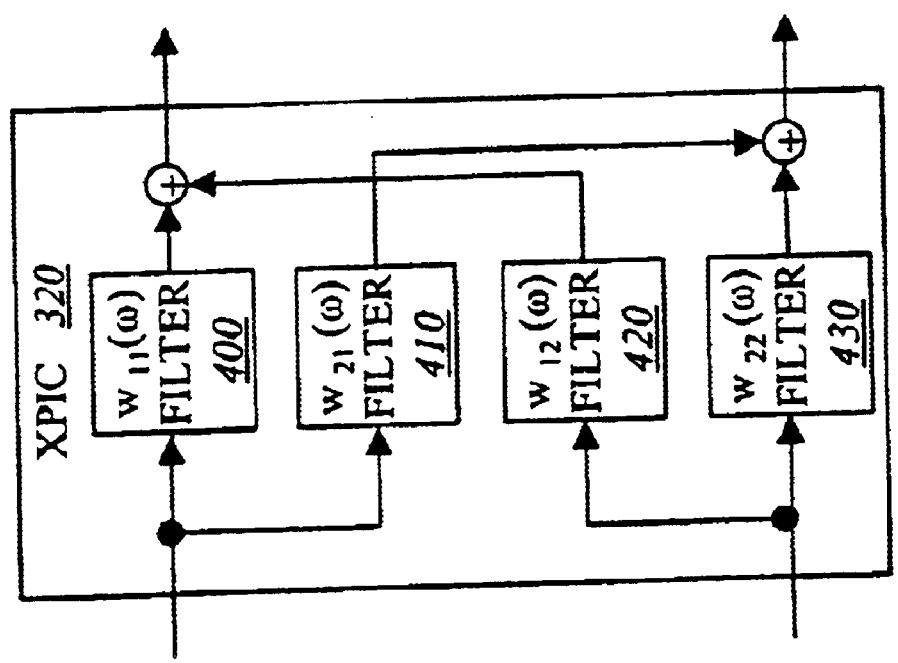
FIG. 4A is an exemplary embodiment of a frequency dependent, optical XPIC comprised of four complex optical filters.
Figure 10B:
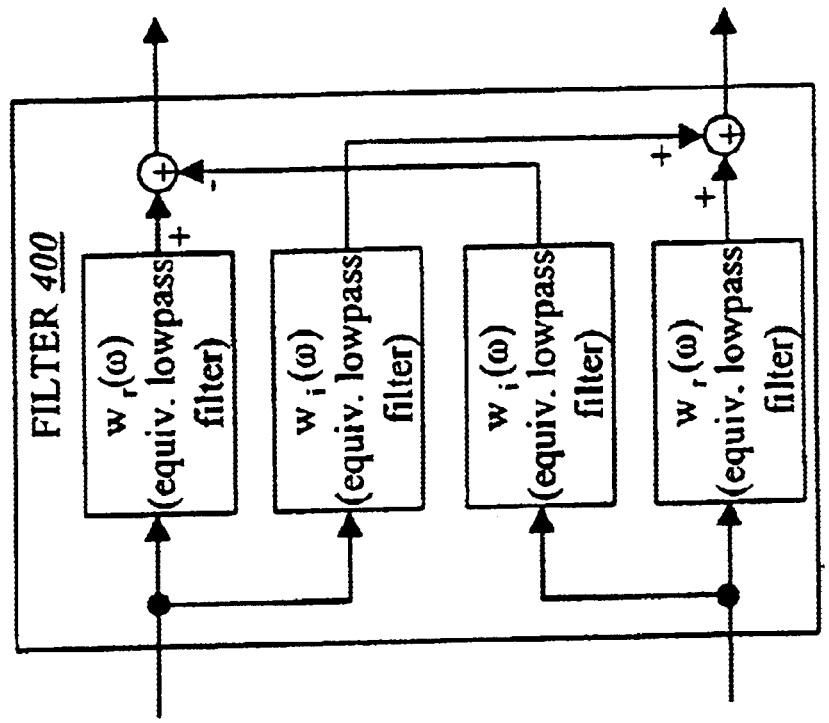
FIG. 10B is an exemplary embodiment of a baseband filter of FIG. 4A that is appropriate for the baseband XPIC of FIG. 9.
Figure 10A:
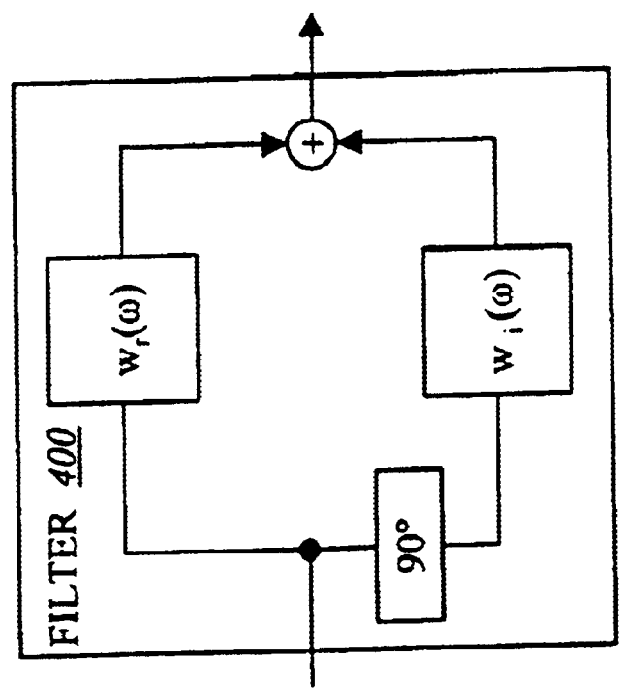
FIG. 10A is an exemplary embodiment of a passband optical or IF filter of FIG. 4A that is appropriate for the passband XPIC of FIGS. 3, 5, and 6.

In general, XPIC 320 is comprised of four independent optical filters 400, 410, 420, and 430 as shown in FIG. 4A. These filters have transfer functions that are specified by the frequency dependent complex elements $w_{11}(\omega)$, $w_{21}(\omega)$, $w_{12}(\omega)$, and $w_{22}(\omega)$ of the XPIC matrix $W(\omega)$. An exemplary implementation of a passband filter with complex frequency response is shown in FIG. 10A where "$w_r(\omega)$ A refers to the real portion of the frequency response and "$w_i(\omega)$" refers to the imaginary portion of the frequency response. Since $T(\omega)$ is time varying, filters 400, 410, 420, and 430 are adaptive in order to track this variation. Suitable implementations of adaptive optical filters 400, 410, 420 and 430 specified by the elements of equation (C.6) have been demonstrated. One example of a well-known adaptation procedure for these filters is the method of differential steepest descent. Other methods from the theory of blind source separation are also appropriate.

If XPIC 320 is configured according to equation (C.6), then inputs ($\underline{\varepsilon}_{S1}(t), \underline{\varepsilon}_{S2}(t)$) 330 and 340 to receivers 350 and 360 are given by $$\begin{bmatrix} \varepsilon_{S1}(t) \\ \varepsilon_{S2}(t) \end{bmatrix} = Re\left\{ \begin{bmatrix} \hat{x} & 0 \\ 0 & \hat{y} \end{bmatrix} \left( \sqrt{P_S} \begin{bmatrix} s_1(t) \\ s_2(t) \end{bmatrix} + F^{-1}\{W(\omega)\} * \begin{bmatrix} n_1(t) \\ n_2(t) \end{bmatrix} \right) \right\} \quad (C.9)$$

or equivalently $$\underline{\varepsilon}_{S1}(t) = Re\{(\sqrt{P_S} s_1(t) + n_3(t)\hat{x}\} \quad (C.10)$$

$$\underline{\varepsilon}_{S2}(t) = Re\{(\sqrt{P_S} s_2(t) + n_4(t)\hat{y}\} \quad (C.11)$$

where $n_3(t)$ and $n_4(t)$ are Gaussian distributed noise processes with power spectral density (psd) specified by $N_3(\omega)$ and $N_4(\omega)$ $$N_3(\omega) = |w_{11}(\omega)|^2 N_1 + |w_{12}(\omega)|^2 N_2 \quad (C.12)$$

$$N_4(\omega) = |w_{21}(\omega)|^2 N_1 + |w_{22}(\omega)|^2 N_2 \quad (C.13)$$

These results show that the electric field at each output of the optical diagonalizer XPIC 320 consists of a desired signal with additive noise. The diagonalizer XPIC therefore completely eliminates cross polarization interference (XPI), polarization mode dispersion (PMD), and chromatic dispersion effects.

The diagonalizer XPIC solution is particularly useful for analytic purposes since the bit error rate (BER) can be computed for a receiver with known noise performance. While in practice, XPIC 320 would normally be converged according to a minimum mean square error (MMSE) criterion, the BER performance with XPIC 320 configured according to the diagonalizer solution has been found to produce a tight upper bound to the BER performance with the MMSE solution as described in detail with respect to the intermediate frequency (IF) XPIC implementation.

Of course, it is contemplated that complex matrix coefficients $w_{11}$, $w_{12}$, $w_{21}$ and $w_{22}$ as shown in FIG. 4B may represent the XPIC matrix W without frequency dependence. These elements are complex in general, and apply both amplitude scaling and phase shifting to the input waveforms.

D. Optical XPIC With Coherent Systems

In general, for coherent systems implemented with an optical XPIC, a receiving device would split the received optical signal having an electric field $\underline{\varepsilon}_S(t)$ into two orthogonally polarized components $\underline{\varepsilon}_{Sx}(t)$ and $\underline{\varepsilon}_{Sy}(t)$. These components would be applied as inputs to an optical XPIC, which would perform complex filtering or weighting, and recombine the results to mitigate cross polarization interference (XPI). More specifically, each output of the XPIC is an optical signal with an electric field that is significantly amplitude and/or phase modulated by only one of the originally transmitted signals. These outputs are then applied to double balanced optical receivers (DBORs). Each DBOR produces a current $i_1(t)$ or $i_2(t)$, that has an IF carrier and contains significant modulation data from only one of the originally transmitted signals. These currents are demodulated to reconstruct the transmitted baseband in-phase and quadrature waveforms.

More specifically, with respect to FIG. 5, optical XPIC 320 of a receiving device 450 operates in the same manner as discussed for FIG. 3. In this case, however, coherent heterodyne receivers rather than IM-DD receivers are used, and the optical XPIC output fields ($\underline{\varepsilon}_{S1}(t)$) 330 and ($\underline{\varepsilon}_{S2}(t)$) 340 are routed to double balanced optical receivers (DBORs) 500 and 510. A first DBOR 500 converts output $\underline{\varepsilon}_{S1}(t)$ 330 into a first output current $i_1(t)$ 520, which is routed to a first demodulator 530. A second DBOR 510 converts output $\underline{\varepsilon}_{S2}(t)$ 340 into a second output current $i_2(t)$ 540, which is routed to a second demodulator 550. If the axes of the LO polarization beam splitter are aligned with the $\hat{x}$ and $\hat{y}$ directions, and the polarization state of the optical LO is adjusted such that the LO power is equally divided by the polarization beam splitter, then the Jones vector specifying the LO polarization state is given by $$\hat{\varepsilon}_L = \begin{bmatrix} \sqrt{P_L} \\ \sqrt{P_L}\, e^{j\delta_L} \end{bmatrix} \quad (D.1)$$

where $P_L$ is the average LO power.

1. Diagonalizer XPIC Signal Reconstruction

If the optical XPIC is configured in accordance with equation (C.6), then the fields at the DBOR inputs will be given by equation (C.9). The DBOR output currents $i_1(t)$ and $i_2(t)$ are then given by $$i_1(t) = R\sqrt{P_S P_L}\, a_1(t)\sin(\omega_{IF}t + \phi(t) + \theta_1(t)) + n_3(t) \quad (D.2)$$

$$i_2(t) = R\sqrt{P_S P_L}\, a_2(t)\sin(\omega_{IF}t + \phi(t) + \theta_2(t) + \delta_L) + n_4(t) \quad (D.3)$$

where "R" is the responsivity of the photodiodes. The intermediate frequency (IF), denoted "$\omega_{IF}$", is equal to the difference between the received carrier frequency and the frequency of the local oscillator ($\omega_{IF} = \omega_S - \omega_L$). Also, "$\phi(t)$" is the difference between the phase noise of the incoming optical signal and the phase noise of optical local oscillator ($\phi(t) = \phi_S(t) - \phi_L(t)$). The components $n_3(t)$ and $n_4(t)$ are noise terms that account for shot and thermal noise, and also ASE if optical amplifiers are present in the fiber optic transmission-medium. These results show that the output of each DBOR is a desired signal plus additive noise. When configured according to the diagonalizer solution, the optical XPIC is therefore able to completely eliminate cross polarization interference (XPI), polarization mode dispersion (PMD), and chromatic dispersion effects in systems with coherent optical receivers.

E. IF XPIC With Coherent Systems

In general, when implemented with an IF XPIC, the receiving device may be configured to split the received optical signal having an electric field $\underline{\varepsilon}_S(t)$ into two orthogonally polarized components $\underline{\varepsilon}_{Sx}(t)$ and $\underline{\varepsilon}_{Sy}(t)$, which are polarized in the $\hat{x}$ and $\hat{y}$ directions, respectively. The receiving device also includes a polarization beam splitter that produces $\hat{x}$ and $\hat{y}$ polarized components from an internal local oscillator. The $\hat{x}$ polarized components of the signal and LO are applied to one DBOR and the $\hat{y}$ polarized components are applied to another DBOR. Thus, the DBORs produce currents $i_1(t)$ and $i_2(t)$ containing modulation components from both originally transmitted signals. These currents are applied to an IF XPIC, which operates on the input currents to produce output currents $i_3(t)$ and $i_4(t)$. Each of these output currents has significant modulation from only one of the transmitted signals. The quadrature demodulators remove the carrier and phase-noise effects and produce the in-phase and quadrature waveforms associated with both transmitted signals.

Referring now to FIG. 6, a block diagram of an illustrative embodiment of receiving device 600 operating in conjunction with an electrical intermediate frequency (IF) XPIC 670 is shown. IF XPIC 670 has the same form as optical XPIC 320 except that complex filters 400, 410, 420, and 430 of FIG. 4A are now electrical and operate at microwave frequencies rather than optical frequencies. As shown, receiving device 600 comprises optical receiver 605 including a pair of polarization beam splitters 610 and 615 to receive polarized optical signal fields. In particular, polarization beam splitter 610 receives an optical signal field 620 over optical fiber transmission medium 235. This received optical signal field 620 ($\underline{\varepsilon}_S(t)$) is formed by the superposition of two modulated electric fields (identified as "$\underline{\varepsilon}_{S1}(t)$" and "$\underline{\varepsilon}_{S2}(t)$"). The electric fields $\underline{\varepsilon}_{S1}(t)$ and $\underline{\varepsilon}_{S2}(t)$ are representative of the first and second polarized signal fields, respectively. The polarization state of received electric field components $\underline{\varepsilon}_{S1}(t)$ and $\underline{\varepsilon}_{S2}(t)$ and the local oscillator $\underline{\varepsilon}_L(t)$ are specified by their respective Jones vector $$\hat{\varepsilon}_{S1} = \begin{bmatrix} \varepsilon_{Sx1} e^{j\delta_{Sx1}} \\ \varepsilon_{Sy1} e^{j\delta_{Sy1}} \end{bmatrix} \quad (E.1)$$

$$\hat{\varepsilon}_{S2} = \begin{bmatrix} \varepsilon_{Sx2} e^{j\delta_{Sx2}} \\ \varepsilon_{Sy2} e^{j\delta_{Sy2}} \end{bmatrix}$$

$$\hat{\varepsilon}_L = \begin{bmatrix} \varepsilon_{Lx} \\ \varepsilon_{Ly} e^{j\delta_L} \end{bmatrix}$$

Though in general the Jones vectors for the received signal fields are frequency dependent as described by equation (B.4), for notational simplicity the frequency dependence of the field parameters will be suppressed in the analysis that follows. Also, polarization beam splitter 615 receives an optical control signal 625 from a local oscillator 630 employed within, or in close proximity to receiving device 600. The received optical signal electric field (referred to as "$\underline{\varepsilon}_S(t)$") is defined by equation (E.2) and the electric field of the local oscillator 625 (referred to as "$\underline{\varepsilon}_L(t)$") is defined in equation (E.3).

$$\underline{\varepsilon}_S(t) = [\varepsilon_{Sx1}a_1(t)\cos(\omega_S t + \phi_S(t) + \theta_1(t) + \delta_{Sx1}) + \quad \text{(E.2)}$$
$$\varepsilon_{Sx2}a_2(t)\cos(\omega_S t + \phi_S(t) + \theta_2(t) + \delta_{Sx2})]\hat{x} +$$
$$[\varepsilon_{Sy1}a_1(t)\cos(\omega_S t + \phi_S(t) + \theta_1(t) + \delta_{Sy1}) +$$
$$\varepsilon_{Sy2}a_2(t)\cos(\omega_S t + \phi_S(t) + \theta_2(t) + \delta_{Sy2})]\hat{y}$$

$$\underline{\varepsilon}_L(t) = [\epsilon_{Lx}\cos(\omega_L t + \phi_L(t))]\hat{x} + [\epsilon_{Ly}\cos(\omega_L t + \phi_L(t) + \delta_L)]\hat{y} \quad \text{(E.3)}$$

It is appreciated that the terms "$\omega_S$" and "$\omega_L$" denote the carrier frequency of optical signal 625 and the frequency of the local oscillator 630; "$\theta_1(t)$" and "$\theta_2(t)$" denote the phase modulation of the independent first and second signals; "$a_1(t)$" and "$a_2(t)$" denote the amplitude modulation of the independent first and second signals, and "$\phi_S(t)$" and "$\phi_L(t)$" are Brownian motion or Wiener phase noise processes for the received optical carrier and the local oscillator respectively.

It is contemplated, but not required, that the first and second signals forming optical signal 620 modulate the same carrier. Also, it is desirable that the polarization of the signal components from local oscillator 630 be maintained such that $\epsilon_{Lx} \cong \epsilon_{Ly}$.

Polarization beam splitters 610 and 615 are used to separate the incoming optical field 620 and optical local oscillator field 625 into $\hat{x}$ and $\hat{y}$ (polarized) field components. Each of these field components is routed to different directional coupler; namely, the $\hat{x}$ components are routed to a directional coupler 640 of a first double balanced optical receiver (DBOR1) 635 and the $\hat{y}$ component is routed to a directional coupler 655 of a second double balanced optical receiver (DBOR2) 650. As shown, each directional coupler 640 or 655 is a four port device that independently performs the following transformation on the $\hat{x}$ and $\hat{y}$ components $$\begin{bmatrix} \varepsilon_1 \\ \varepsilon_2 \end{bmatrix} = \begin{bmatrix} \sqrt{1-\alpha} & \sqrt{\alpha}\,e^{j\frac{\pi}{2}} \\ \sqrt{\alpha}\,e^{j\frac{\pi}{2}} & \sqrt{1-\alpha} \end{bmatrix} \begin{bmatrix} \varepsilon_S \\ \varepsilon_L \end{bmatrix} \quad \text{(E.4)}$$

where "$\alpha$" is the power coupling coefficient ranging from 0 to 1. Thus, the outputs of directional coupler 640 that receives the $\hat{x}$ components of the signal and LO electric fields are defined as follows:

$$\underline{\varepsilon}_1(t) = [\sqrt{1-\alpha}\,(\varepsilon_{Sx1}a_1(t)\cos(\omega_S t + \phi_S(t) + \theta_1(t) + \delta_{Sx1}) + \quad \text{(E.5)}$$
$$\varepsilon_{Sx2}a_2(t)\cos(\omega_S t + \phi_S(t) + \theta_2(t) + \delta_{Sx2})) -$$
$$\sqrt{\alpha}\,\epsilon_{Lx}\sin(\omega_L t + \phi_L(t))]\hat{x}$$

$$\underline{\varepsilon}_2(t) = [-\sqrt{\alpha}\,(\varepsilon_{Sx1}a_1(t)\sin(\omega_S t + \phi_S(t) + \theta_1(t) + \delta_{Sx1}) + \quad \text{(E.6)}$$
$$\varepsilon_{Sx2}a_2(t)\sin(\omega_S t + \phi_S(t) + \theta_2(t) + \delta_{Sx2})) +$$
$$\sqrt{1-\alpha}\,\epsilon_{Lx}\cos(\omega_L t + \phi_L(t))]\hat{x}$$

As further shown in FIG. 6, each of the photodetector diodes 645 and 660 respond with a current proportional to the incident instantaneous optical power $|\underline{\varepsilon}(t)|^2$. High frequency components are neglected when outside the bandwidth of diodes 645 and 660. Expressions for the optical power at the two photodiodes 645 and 660 are set forth in equations (E.7, E.8).

$$|\varepsilon_1(t)|^2 = \left(\frac{1-\alpha}{2}\right)\varepsilon_{Sx1}^2 a_1^2(t) + \left(\frac{1-\alpha}{2}\right)\varepsilon_{Sx2}^2 a_2^2(t) + \left(\frac{\alpha}{2}\right)\epsilon_{Lx}^2 + \quad \text{(E.7)}$$
$$(1-\alpha)\varepsilon_{Sx1}\varepsilon_{Sx2}a_1(t)a_2(t)\cos(\theta_1(t) - \theta_2(t) + \delta_{Sx1} - \delta_{Sx2}) +$$
$$\sqrt{(1-\alpha)\alpha}\,\varepsilon_{Sx1}\epsilon_{Lx}a_1(t)\sin(\omega_{IF}t + \phi(t) + \theta_1(t) + \delta_{Sx1}) +$$
$$\sqrt{(1-\alpha)\alpha}\,\varepsilon_{Sx2}\epsilon_{Lx}a_2(t)\sin(\omega_{IF}t + \phi(t) + \theta_2(t) + \delta_{Sx2})$$

$$|\varepsilon_2(t)|^2 = \left(\frac{\alpha}{2}\right)\varepsilon_{Sx1}^2 a_1^2(t) + \left(\frac{\alpha}{2}\right)\varepsilon_{Sx2}^2 a_2^2(t) + \left(\frac{1-\alpha}{2}\right)\epsilon_{Lx}^2 + \quad \text{(E.8)}$$
$$(\alpha)\varepsilon_{Sx1}\varepsilon_{Sx2}a_1(t)a_2(t)\cos(\theta_1(t) - \theta_2(t) + \delta_{Sx1} - \delta_{Sx2}) -$$
$$\sqrt{(1-\alpha)\alpha}\,\varepsilon_{Sx1}\epsilon_{Lx}a_1(t)\sin(\omega_{IF}t + \phi(t) + \theta_1(t) + \delta_{Sx1}) -$$
$$\sqrt{(1-\alpha)\alpha}\,\varepsilon_{Sx2}\epsilon_{Lx}a_2(t)\sin(\omega_{IF}t + \phi(t) + \theta_2(t) + \delta_{Sx2})$$

The intermediate frequency (IF) is denoted as "$\omega_{IF}$" and is the difference between the received carrier frequency and the frequency of the local oscillator ($\omega_{IF} = \omega_S - \omega_L$). Also, "$\phi(t)$" is the difference between the phase noise of incoming optical signal 620 and the phase noise of optical local oscillator 625 ($\phi(t) = \phi_S(t) - \phi_L(t)$).

For DBOR1 635, the output current ($i_1(t)$) is computed in accordance to equation (E.9).

$$i_1(t) = R(|\underline{\varepsilon}_1(t)|^2 - |\underline{\varepsilon}_2(t)|^2) + n_1(t) \quad \text{(E.9)}$$

The term "R" is equal to the responsivity of photodiodes 645 and 660. The component "$n_1(t)$" accounts for the shot and thermal noise and is a white Gaussian noise process with power spectral density (psd) specified by $$N_1 = eR\varepsilon_{Lx}^2 + \frac{4kTF}{R_L}, \quad \text{(E.10)}$$

where "e" is the electronic charge ($1.602 \times 10^{-19}$ C), "k" is the Boltzmann constant ($1.38 \times 10^{-23}$ J/° K.), "T" is the absolute temperature (° K.), "F" is the noise factor of the amplifier following the photodiodes of DBOR1 635, and "$R_L$" is the equivalent load resistance seen by DBOR1 635. For example, using a selected power coupling coefficient (e.g., $\alpha = \frac{1}{2}$), the output of DBOR1 635 is the following:

$$i_1(t) = R[\epsilon_{Sx1}\epsilon_{Lx}a_1(t)\sin(\omega_{IF}t + \phi(t) + \theta_1(t) + \delta_{Sx1}) +$$
$$\epsilon_{Sx2}\epsilon_{Lx}a_2(t)\sin(\omega_{IF}t + \phi(t) + \theta_2(t) + \delta_{Sx2})] + n_1(t) \quad \text{(E.11)}$$

Similarly, the output ($i_2(t)$) of DBOR2 650 that receives the $\hat{y}$ polarized signal and LO components is computed as $$i_2(t) = R[\epsilon_{Sy1}\epsilon_{Ly}a_1(t)\sin(\omega_{IF}t + \phi(t) + \theta_1(t) + \delta_{Sy1} - \delta_L) +$$
$$\epsilon_{Sy2}\epsilon_{Ly}a_2(t)\sin(\omega_{IF}t + \phi(t) + \theta_2(t) + \delta_{Sy2} - \delta_L)] + n_2(t) \quad \text{(E.12)}$$

where the power spectral density of the noise current for this channel is given by $$N_2 = eR\varepsilon_{Ly}^2 + \frac{4kTF}{R_L} \quad \text{(E.13)}$$

If optical amplifiers are present in the fiber optic transmission medium, then an appropriate ASE component should be added to equations (E.10) and (E.13). Thus, the outputs ($i_1(t)$, $i_2(t)$) of DBORs 635 and 650 can be expressed in matrix form.

$$\begin{bmatrix} i_1(t) \\ i_2(t) \end{bmatrix} = \text{Re}\left\{ R \begin{bmatrix} \varepsilon_{Sx1}\varepsilon_{Lx}e^{j(\delta_{Sx1}-\frac{\pi}{2})} & \varepsilon_{Sx2}\varepsilon_{Lx}e^{j(\delta_{Sy2}-\frac{\pi}{2})} \\ \varepsilon_{Sy1}\varepsilon_{Ly}e^{j(\delta_{Sy1}-\delta_L-\frac{\pi}{2})} & \varepsilon_{Sy2}\varepsilon_{Ly}e^{j(\delta_{Sy2}-\delta_L-\frac{\pi}{2})} \end{bmatrix} \begin{bmatrix} s_1(t) \\ s_2(t) \end{bmatrix} + \begin{bmatrix} n_1(t) \\ n_2(t) \end{bmatrix} \right\}, \quad (E.14)$$

which has the form $$\begin{bmatrix} i_1(t) \\ i_2(t) \end{bmatrix} = \text{Re}\left\{ X \begin{bmatrix} s_1(t) \\ s_2(t) \end{bmatrix} + \begin{bmatrix} n_1(t) \\ n_2(t) \end{bmatrix} \right\} \quad (E.15)$$

where $$s_1(t) = v_1(t)e^{j\omega_{IF}t+\phi(t)} \quad (E.16)$$

is the complex form of the first IF signal, $$s_2(t) = v_2(t)e^{j\phi_{IF}t+\phi(t)} \quad (E.17)$$

is the complex form of the second IF signal, and $$v_k(t) = a_k(t)e^{j\theta_k(t)} = I_k(t) + jQ_k(t) \quad (E.18)$$

is the complex envelope representation of the information bearing signal component.

The 2×2 complex matrix X in equation (E.15) represents the cross polarization interference (XPI) of the two received signals as set forth in equation (E.19).

$$X = R\begin{bmatrix} \varepsilon_{Sx1}\varepsilon_{Lx}e^{j(\delta_{Sx1}-\frac{\pi}{2})} & \varepsilon_{Sx2}\varepsilon_{Lx}e^{j(\delta_{Sx2}-\frac{\pi}{2})} \\ \varepsilon_{Sy1}\varepsilon_{Ly}e^{j(\delta_{Sy1}-\delta_L-\frac{\pi}{2})} & \varepsilon_{Sy2}\varepsilon_{Ly}e^{j(\delta_{Sy2}-\delta_L-\frac{\pi}{2})} \end{bmatrix} \quad (E.19)$$

When the polarization states of the received optical fields are frequency dependent due to the effects of the fiber optic transmission medium, then the form of the frequency dependent XPI matrix $X(\omega)$ is $$X(\omega) = R\begin{bmatrix} \varepsilon_{Sx1}(\omega)\varepsilon_{Lx}e^{j(\delta_{Sx1}(\omega)-\frac{\pi}{2})} & \varepsilon_{Sx2}(\omega)\varepsilon_{Lx}e^{j(\delta_{Sx2}(\omega)-\frac{\pi}{2})} \\ \varepsilon_{Sy1}(\omega)\varepsilon_{Ly}e^{j(\delta_{Sy1}(\omega)-\delta_L-\frac{\pi}{2})} & \varepsilon_{Sy2}(\omega)\varepsilon_{Ly}e^{j(\delta_{Sy2}(\omega)-\delta_L-\frac{\pi}{2})} \end{bmatrix} \quad (E.20)$$

with the frequency response of the optical signal field polarization parameters now translated to the IF range by the downconversion process of DBORs 635 and 650. The form of equation (E.15) in this case is $$\begin{bmatrix} i_1(t) \\ i_2(t) \end{bmatrix} = \text{Re}\left\{ F^{-1}\{X(\omega)\} * \begin{bmatrix} s_1(t) \\ s_2(t) \end{bmatrix} + \begin{bmatrix} n_1(t) \\ n_2(t) \end{bmatrix} \right\} \quad (E.21)$$

Thus, the output from XPIC 670 can be expressed in matrix form as follows:

$$\begin{bmatrix} i_3(t) \\ i_4(t) \end{bmatrix} = \text{Re}\left\{ F^{-1}\{W(\omega)\}\{X(\omega)\} * \begin{bmatrix} s_1(t) \\ s_2(t) \end{bmatrix} + \begin{bmatrix} n_3(t) \\ n_4(t) \end{bmatrix} \right\}, \quad (E.22)$$

where "$W(\omega)$" represents the frequency dependent 2×2 complex XPIC matrix and $n_3(t)$ and $n_4(t)$ are Gaussian processes with one-sided power spectral densities as defined by "$N_3$" and $N_4$"

$$N_3(\omega) = |w_{11}(\omega)|^2 N_1 + |w_{12}(\omega)|^2 N_2 \quad (E.23)$$

$$N_4(\omega) = |w_{21}(\omega)|^2 N_1 + |w_{22}(\omega)|^2 N_2. \quad (E.24)$$

The input noise power spectral densities "$N_1$" and "$N_2$" are specified by equations (E.10) and (E.13) and "$w_{mn}(\omega)$" (m=1,2; n=1,2) are the corresponding elements of the complex XPIC matrix $W(\omega)$. Equations (E.23) and (E.24) are easily verified by anyone with knowledge of linear system theory.

In order to completely cancel cross polarization interference (XPI) and fiber dispersion effects, it is contemplated that the XPIC transfer function matrix $W(\omega)$ should be configured in order to force the cross polarization interference to zero.

1. Diagonalizer XPIC Signal Reconstruction

Referring back to FIG. 6, one method of achieving interference cancellation is to determine the form of the XPIC matrix $W(\omega)$ that forces the cross polarization interference to zero, which is equivalent to diagonalizing the overall link transmission matrix $W(\omega)X(\omega)$ (referred to as "zero-forcing cancellation"). Provided that the XPI matrix $X(\omega)$ is invertible then the form of the diagonalizer XPIC matrix is $$W(\omega)_{diag} = \quad (E.25)$$

$$X(\omega)^{-1} = K(\omega)\begin{bmatrix} \dfrac{\varepsilon_{Sy2}(\omega)}{\varepsilon_{Lx}}e^{j(\delta_{Sy2}(\omega)-\delta_L)} & -\dfrac{\varepsilon_{Sx2}(\omega)}{\varepsilon_{Ly}}e^{j\delta_{Sx2}(\omega)} \\ -\dfrac{\varepsilon_{Sy1}(\omega)}{\varepsilon_{Lx}}e^{j(\delta_{Sy1}(\omega)-\delta_L)} & \dfrac{\varepsilon_{Sx1}(\omega)}{\varepsilon_{Ly}}e^{j\delta_{Sx1}(\omega)} \end{bmatrix}$$

where the complex scaler $K(\omega)$ is given by $$K(\omega) = \frac{e^{j\frac{\pi}{2}}}{R\left(\varepsilon_{Sx1}(\omega)\varepsilon_{Sy2}(\omega)e^{j(\delta_{Sx1}(\omega)+\delta_{Sy2}(\omega)-\delta_L)} - \varepsilon_{Sx2}(\omega)\varepsilon_{Sy1}(\omega)e^{j(\delta_{Sx2}(\omega)+\delta_{Sy1}(\omega)-\delta_L)}\right)} \quad (E.26)$$

Equations (E.25) and (E.26) are easily verified by anyone with knowledge of linear algebra. If XPIC 670 is configured according to the matrix $W(\omega)_{diag}$, then the desired signals will be identically reconstructed and the input to demodulators 675 and 680 will be the following:

$$\begin{bmatrix} i_3(t) \\ i_4(t) \end{bmatrix} = \text{Re}\left\{ \begin{bmatrix} s_1(t) \\ s_2(t) \end{bmatrix} + \begin{bmatrix} n_3(t) \\ n_4(t) \end{bmatrix} \right\} \quad (E.27)$$

or equivalently $$i_3(t) = a_1(t)\cos(\omega_{IF}t + \phi(t) + \theta_1(t)) + n_3(t) \quad (E.28)$$

$$i_4(t) = a_2(t)\cos(\omega_{IF}t + \phi(t) + \theta_2(t)) + n_4(t) \quad (E.29)$$

where "$n_3(t)$" and "$n_4(t)$" are Gaussian noise processes with psd specified by equations (E.23) and (E.24) respectively.

From equations (E.28) and (E.29), it is evident that the transmitted signals can be recovered at the receiving device provided that the XPI matrix of equation (E.25) is invertible. This requirement will be met unless the optical fiber transmission medium is perfectly polarizing and the received signals therefore have identical polarization states or states that differ only in magnitude. That is, if $$\frac{\varepsilon_{Sx2}(\omega)}{\varepsilon_{Sy2}(\omega)}e^{j(\delta_{Sx2}(\omega)-\delta_{Sy2}(\omega))} = \frac{\varepsilon_{Sx1}(\omega)}{\varepsilon_{Sy1}(\omega)}e^{j(\delta_{Sx1}(\omega)-\delta_{Sy1}(\omega))} \quad (E.30)$$

then the XPI matrix is singular and the zero-forcing solution does not exist. Fortunately it has been shown theoretically and experimentally that when optical signals with orthogonal polarizations are launched into a long fiber, orthogonality is substantially preserved. Measurements made for 150 kilometers of standard, single mode optical fiber indicate a loss in orthogonality of less than 6 degrees.

To serve as an example of the expected XPIC link performance, the bit-error rate (BER) of the diagonalizer XPIC receiver for binary phase shift keying (BPSK) and quadrature phase shift keying (QPSK) modulation and an XPI matrix with no frequency dependence will be evaluated. The well-known expression for the probability of bit error or bit error rate for BPSK with ideal carrier phase recovery and detection is $$P_E = \frac{1}{2} erfc\left(\sqrt{\frac{E_s}{N_0}}\right) \quad (E.31)$$

where $E_s$ and $N_0$ are the symbol energy and AWGN one-sided psd at the demodulator input, respectively. In order to characterize the XPIC receiver this relation must be modified to account for the effect of the XPIC network on the signals and AWGN. Since the diagonalizer XPIC identically reconstructs the transmitted signals at the demodulator inputs, the expression for $E_s$ is given by $$E_S = E\left\{\frac{1}{2}\int_0^{T_s} |v(t)|^2 \, dt\right\} \quad (E.32)$$

where $E\{\cdot\}$ represents the expectation operator. If the average symbol energy $E_{sk}$ for polarization channel k is defined as the total average energy per symbol at the both XPIC inputs due to signal $s_k(t)$ $$E_{s1} = (|x_{11}|^2 + |x_{21}|^2)E\left\{\frac{1}{2}\int_0^{T_s} |v_1(t)|^2 \, dt\right\} \quad (E.33)$$

$$E_{s2'} = (|x_{12}|^2 + |x_{22}|^2)E\left\{\frac{1}{2}\int_0^{T_s} |v_2(t)|^2 \, dt\right\} \quad (E.34)$$

then the expression for the bit error rate for the first polarization channel of an XPIC receiver is $$P_E = \frac{1}{2} erfc\left(a_1 \sqrt{\frac{E_{s1}}{N_3}}\right) \quad (E.35)$$

where $N_3$ is the psd at the XPIC output specified by equation (E.23) and the parameter $a_1$ is given by $$a_1 = \frac{1}{\sqrt{|x_{11}|^2 + |x_{21}|^2}} \quad (E.36)$$

Each BPSK symbol carries one bit of information and the symbol energy $E_s$ is therefore equal the bit energy $E_b$. It should be noted that for the diagonalizer XPIC system using QPSK with ideal quadrature demodulation there is no interaction between the in-phase and quadrature components and by simply replacing the symbol energy $E_{s1}$ with bit energy $E_b$, equation (E.35) specifies the bit error rate for both BPSK and QPSK. In addition, if $\epsilon_{Lx} = \epsilon_{Ly}$ then from equations (E.10) and (E.13) $N_1 = N_2$. Substituting $E_b$ for $E_{s1}$ and using equation (E.23) with a single noise psd parameter $N_0$ for both $N_1$ and $N_2$, equation (E.35) becomes $$P_E = \frac{1}{2} erfc\left(\frac{a_1}{\sqrt{|w_{11}|^2 + |w_{12}|^2}} \sqrt{\frac{E_b}{N_0}}\right) \quad (E.37)$$

Figure 7:
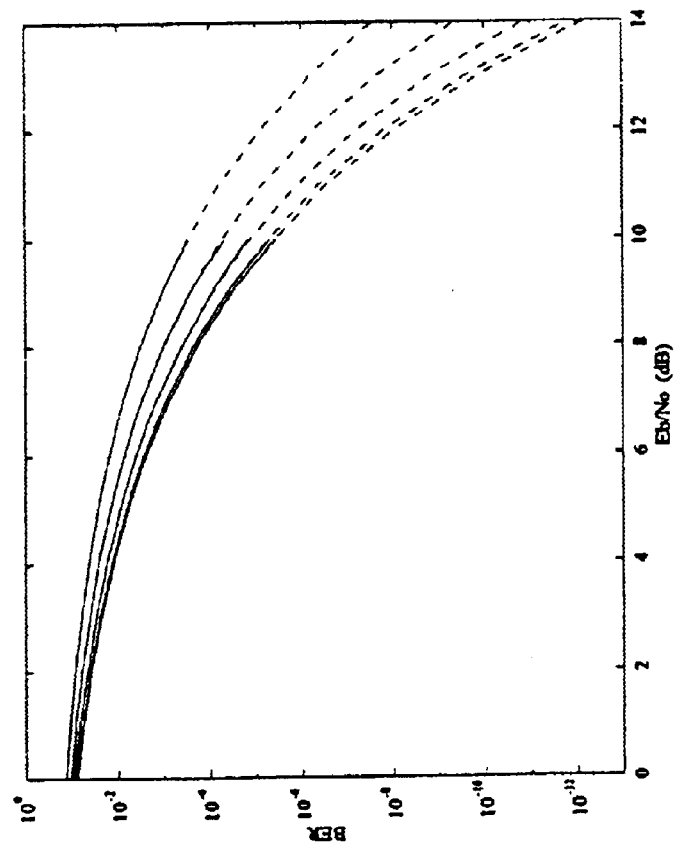
FIG. 7 is a graphical representation of the theoretical (dashed) and simulated (solid) bit error rate for a fiber optic link using binary phase shift keying with varying amounts of loss of orthogonality in accordance with FIG. 6 using a diagonalizer XPIC.

Equation (E.37) is plotted in FIG. 7 for varying amounts of loss of orthogonality (dashed) along with monte-carlo simulation results (solid). Curves are shown for received optical signals having 0, 10, 20, 30, and 40 degrees loss of orthogonality. The plots show that the BER performance with the diagonalizer XPIC is equal to that of the optimum receiver when the received signals are orthogonally polarized and the degradation from ideal performance is negligible when the loss of orthogonality is less than ten degrees. The XPIC receiver is therefore able to double the link bandwidth efficiency with almost no degradation in BER performance relative the conventional optimum receiver.

2. MMSE XPIC Signal Reconstruction

The diagonalizer solution completely eliminates XPI, but at the expense of a degraded signal-to-noise ratio (SNR) when the components forming the received optical electric field 620 of FIG. 6 are non-orthogonal. Another solution that would produce a compromise between interference cancellation and SNR reduction is the minimum mean square error (MMSE) XPIC solution. The analysis of the MMSE XPIC solution is complicated by the fact that it is dependent on implementation issues such as the demodulator architecture and IF carrier frequencies and symbol rates of the two received signals.

To facilitate analysis of the MMSE XPIC solution, a number of conditions are assumed. First, the XPI matrix X is assumed to have no frequency dependence over the IF bandwidth of interest. Second, receiving device 600 uses ideal quadrature demodulators that are able to track the phase noise of the desired signal in each channel. Third, the received signals are assumed to be mean zero and independent with stationary distribution, and the noise of each channel is assumed to be independent stationary additive white Gaussian noise (AWGN). Finally, the IF carrier frequencies and symbol rates are identical for both channels and the symbols are time aligned. The last assumption corresponds to a worst case XPI scenario and results in an upper bound to the system bit error rate (BER) performance. Under these conditions the MMSE solution can be determined.

In the most general system where separate lasers are used for the orthogonal components at either transmitting device 210 or receiving device 600, the phase noise on each channel will be different. In this case, ideal carrier phase recovery removes the phase fluctuations from the desired signals in each channel and creates additional phase noise in the interference signal. The mean square error caused by the interference signal in a quadrature demodulator depends only on the magnitude of the interference and is independent of the phase. Consequently, the optimum MMSE XPIC solution for a receiving device with ideal carrier phase recover is independent of phase noise, and the system model used to derive the form of the network need not include phase noise or phase recovery effects.

For the purpose of deriving the MMSE XPIC solution, the complex decision variable vector representing the outputs of two ideal quadrature demodulators and detectors at sample time $nT_s$ can therefore be represented as $$z(n) = \frac{1}{2}\int_{(n-1)T_s}^{nT_s} u(t-(n-1)T_s)W(X\underline{v}(t)+\underline{n}(t))\,dt \qquad (E.38)$$

where "u(t)" is the signal pulse shape, "X" is the XPI matrix of equation (E.19), "W" is the XPIC matrix, "$\underline{v}(t)$" is a vector representing the signal complex envelopes $v_1(t)$ and $v_2(t)$, and "$\underline{n}(t)$" is an AWGN noise vector with components $n_1(t)$ and $n_2(t)$. That is, the IF carrier frequency is removed in the ideal quadrature demodulation process and the resulting baseband in-phase and quadrature signals are processed with ideal correlation detection. Any residual phase noise following the ideal quadrature demodulation process can be neglected for the reasons previously stated. The power spectral densities of $n_1(t)$ and $n_2(t)$ are given by equations (E.10) and (E.13) respectively. For notational simplicity, equation (E.38) will be written as $$\underline{z}(n) = W < X\,\underline{v}(t) + \underline{n}(t) > \qquad (E.39)$$

where "< >" represents the ideal demodulation and detection operator as previously described. The MMSE value for the XPIC matrix $W_{mmse}$ is equal to $[R^{-1}P]^H$, where "R" is the correlation matrix of the decision variables without XPIC (see equation E.40) and "P" is the cross correlation between the decision variable vector without XPIC and the desired decision variable vector $\underline{d}$ (see equation E.41) as described below.

$$R = E\{<X\underline{v}(t)+\underline{n}(t)><X\underline{v}(t)+\underline{n}(t)>^H\} \qquad (E.40)$$

$$P = E\{<X\underline{v}(t)+\underline{n}(t)>\underline{d}^H\}. \qquad (E.41)$$

If the noise is mean zero and independent of the signals, then the correlation matrix R and the cross correlation matrix P can be expressed as the following:

$$R = XR_s X^H + R_n \qquad (E.42)$$

$$P = XP_{sd} \qquad (E.43)$$

where "$R_s$" and "$R_n$" are the correlation matrices of the signal and AWGN components of the decision variables respectively and $P_{sd}$ is the cross correlation between the signal components of the decision variable and the desired decision variables $$R_s = E\{<\underline{v}(t)><\underline{v}(t)>^H\} \qquad (E.44)$$

$$R_n = E\{<\underline{n}(t)><\underline{n}(t)>^H\} \qquad (E.45)$$

$$P_{sd} = E\{<\underline{v}(t)\underline{d}^H>\}. \qquad (E.46)$$

The desired decision variable vector $\underline{d} = <\underline{v}(t)>$ is simply the response of the ideal detector to the signals without XPI or XPIC. That is, the response of the ideal receiver to the transmitted signals without distortion or polarization misalignment effects.

For wide-sense stationary, mean zero, independent signal and noise components the correlation and cross correlation matrices are $$R_s = P_{sd} = \begin{bmatrix} \sigma_{s1}^2 & 0 \\ 0 & \sigma_{s2}^2 \end{bmatrix} \qquad (E.47)$$

$$R_n = \begin{bmatrix} \sigma_{n1}^2 & 0 \\ 0 & \sigma_{n2}^2 \end{bmatrix}, \qquad (E.48)$$

where "$\sigma_{si}^2$" and "$\sigma_{ni}^2$" are the variances of the decision variable component due to the desired signal and AWGN respectively without XPI or XPIC. For ideal quadrature demodulation and detection of linear modulation formats such as PSK with non-return to zero (NRZ) pulse shape and QAM these variances are given by $$\sigma_{sk}^2 = \varepsilon E\left\{\frac{1}{2}\int_0^{T_s} |v_k(t)|^2\,dt\right\} \; k=1,2 \qquad (E.49)$$

$$\sigma_{nk}^2 = \varepsilon N_k \; k=1,2 \qquad (E.50)$$

where "$v_k(t)$" is the complex envelope of the information-bearing signal component, $N_k$ are the AWGN power spectral densities given by equations (E.10) and (E.13), and "$\varepsilon$" is the energy of the spectrum shaping pulse given by $$\varepsilon = \frac{1}{2}\int_0^{T_s} u^2(t)\,dt. \qquad (E.51)$$

Using equations (E.40–E.43), and the fact that $P_{sd}=R_s$, the MMSE XPIC matrix is specified by $$W_{mmse} = \left[\left[X^H + [R_n^{-1} X R_s]^{-1}\right]^{-1}\right]^H \qquad (E.52)$$

Using equations (E.47) and (E.48), the signal and noise dependent term is $$R_n^{-1} X R_s = \begin{bmatrix} \dfrac{\sigma_{s1}^2}{\sigma_{n1}^2}x_{11} & \dfrac{\sigma_{s2}^2}{\sigma_{n1}^2}x_{12} \\ \dfrac{\sigma_{s1}^2}{\sigma_{n2}^2}x_{21} & \dfrac{\sigma_{s2}^2}{\sigma_{n2}^2}x_{22} \end{bmatrix} \qquad (E.53)$$

If the average symbol energy "$E_{sk}$" is defined as the total average energy per symbol at both inputs to the XPIC 670 due to signal $s_k(t)$ $$E_{s1} = (|x_{11}|^2 + |x_{21}|^2)E\left\{\frac{1}{2}\int_0^{T_s}|v_1(t)|^2\,dt\right\} \qquad (E.54)$$

$$E_{s2} = (|x_{12}|^2 + |x_{22}|^2)E\left\{\frac{1}{2}\int_0^{T_s}|v_2(t)|^2\,dt\right\} \qquad (E.55)$$

then from equation (E.49) the variances of the decision variable component due to the signals are the following:

$$\sigma_{s1}^2 = \frac{\varepsilon E_{s1}}{|x_{11}|^2 + |x_{21}|^2} \qquad (E.56)$$

$$\sigma_{s2}^2 = \frac{\varepsilon E_{s2}}{|x_{12}|^2 + |x_{22}|^2} \qquad (E.57)$$

Substituting (E.50), (E.56), and (E.57) into equation (E.53)

$$R_n^{-1} X R_s = \begin{bmatrix} \frac{E_{s1}}{N_1} \frac{x_{11}}{|x_{11}|^2 + |x_{21}|^2} & \frac{E_{s2}}{N_1} \frac{x_{12}}{|x_{12}|^2 + |x_{22}|^2} \\ \frac{E_{s1}}{N_1} \frac{x_{21}}{|x_{11}|^2 + |x_{21}|^2} & \frac{E_{s2}}{N_2} \frac{x_{12}}{|x_{12}|^2 + |x_{22}|^2} \end{bmatrix} \quad (E.58)$$

This result along with equation (E.52) shows the explicit dependence of the MMSE XPIC solution on the XPI matrix X and the SNR at input of XPIC 670 of FIG. 6. Equation (E.52) reduces the diagonalizer solution in the limit of large SNR in agreement with intuition. For orthogonally polarized and equal power received signals, and for LO power equally divided between the $\hat{x}$ and $\hat{y}$ polarized field components, the MMSE XPIC is also a diagonalizer at any SNR.

To serve as an example of the expected link performance with an MMSE XPIC, the bit error rate for BPSK modulation and an XPI matrix with no frequency dependence will be evaluated. It was previously pointed out that the MMSE solution for the XPIC is independent of phase noise and phase recovery effects. This is not the case in general for the bit error rate, and phase noise effects must be accounted for in the analysis. The expression for the decision variables including ideal phase recovery is $$z(n) = \frac{1}{2} \int_{(n-1)T_s}^{nT_s} u(t - (n-1)T_s) DW[X\underline{s}(t) + \underline{n}(t)] dt \quad (E.59)$$

where the vector "$\underline{s}(t)$" is the IF signal vector with components specified by equations (E.16) and (E.17) and "D" is a matrix representing the ideal demodulation process $$D = \begin{bmatrix} e^{-j(\omega_{IF} t + \phi(t))} & 0 \\ 0 & e^{-j(\omega_{IF} t + \phi(t))} \end{bmatrix} \quad (E.60)$$

This form of the demodulation matrix assumes that single lasers are split to generate the orthogonal optical carriers in the transmitter and the optical LO components in the receiver. In this case the IF phase noise on each channel will be identical and is removed in the demodulation process. Assuming a rectangular pulse shape u(t), the component of the decision variable vector corresponding to channel 1 at sample time n=1 is given by $$z_1 = c_{11} \epsilon (I_1 + jQ_1) + c_{12} \epsilon (I_2 + jQ_2) + N \quad (E.61)$$

where "$I_k + jQ_k$" are the data symbols of signal "$s_k(t)$" during the first symbol interval and where "$c_{11}$ and $c_{12}$" are elements of the overall link transmission matrix specified by $$C = WX. \quad (E.62)$$

The component N is a complex Gaussian distributed random variable with variance $$\sigma_N^2 = \epsilon N_3 \quad (E.63)$$

where "$N_3$" is the psd at XPIC output specified by equation (E.23). For BPSK $Q_1(n) = Q_2(n) = 0$ and the demodulator extracts the real component of the complex decision variable. When the XPIC is configured according to the MMSE solution the diagonal elements of the link transmission matrix C are real but the off-diagonal elements can be complex. The real portion of equation (E.61) can therefore be expressed as the sum of two independent random variables $$\text{Re}\{z_1\} \approx x + y \quad (E.64)$$

where "x" accounts for the desired signal and the AWGN $$x = c_{11} \epsilon I_1 + \text{Re}\{N\} \quad (E.65)$$

and "y" accounts for the effects of the XPI $$y = \epsilon I_2 \text{Re}\{c_{12}\}. \quad (E.66)$$

The probability density function of the decision variable component specified by equation (E.65) is $$f_X(x) = \frac{1}{\pi \sigma_N} e^{-\frac{1}{2}\left(\frac{x - \mu}{\sigma_N / 2}\right)^2} \quad (E.67)$$

where "$\mu$" is the decision variable component due to the desired signal. For $I_1$ in the 'mark' state the value of $\mu$ is $$\mu = \frac{c_{11} \sqrt{\epsilon E_{s1}}}{\sqrt{|x_{11}|^2 + |x_{21}|^2}} \quad (E.68)$$

where "$E_{s1}$" is the total symbol energy at the XPIC network input in both channels due to signal $s_1(t)$. The pdf of the XPI decision variable component specified by equation (E.66) assuming equi-probable symbols is $$f_Y(y) = \frac{1}{2} [\delta(y - \eta_1) + \delta(y + \eta_1)] \quad (E.69)$$

where "$\delta(\cdot)$" represents the Dirac delta function and the parameter "$\eta_1$" is given by $$\eta_1 = \frac{\text{Re}\{c_{12}\} \sqrt{\epsilon E_{s2}}}{\sqrt{|x_{12}|^2 + |x_{22}|^2}}. \quad (E.70)$$

From equation (E.64) the pdf of the real component of the decision variable $z_1$ is the convolution of $f_x(x)$ and $f_y(y)$ $$f_{z_r}(z) = \int_{-\infty}^{\infty} f_X(z - y) f_Y(y) dy \quad (E.71)$$

and the probability of symbol error or bit error rate for $I_1$ in the 'mark' state is given by $$P_E = \int_{-\infty}^{0} f_{z_r}(z) dz \quad (E.72)$$

Evaluating equation (E.72), the probability of error is $$P_E = \frac{1}{4} \left[ \text{erfc}\left( a_1 c_{11} \sqrt{\frac{E_{s1}}{N_3}} + a_2 \text{Re}\{c_{12}\} \sqrt{\frac{E_{s2}}{N_3}} \right) + \text{erfc}\left( a_1 c_{11} \sqrt{\frac{E_{s1}}{N_3}} - a_2 \text{Re}\{c_{12}\} \sqrt{\frac{E_{s2}}{N_3}} \right) \right] \quad (E.73)$$

where "$N_3$" is given by equation (E.23), the parameter "$a_1$" is given by equation (E.36), and parameter "$a_2$" is $$a_2 = \frac{1}{\sqrt{|x_{12}|^2 + |x_{22}|^2}}. \quad \text{(E.74)}$$

Although this result was derived for a transmitted 'mark' state it is also valid for a 'space' state due to the symmetry of the BPSK constellation. Equation (E.73) reduces to the expression obtained for the BER of the diagonalizer XPIC when C=I. Substituting $E_b$ for $E_{s1}$ and $E_{s2}$ and using equation (E.23) with a single noise psd parameter $N_0$ for both $N_1$ and $N_2$, equation (E.73) becomes $$P_E = \frac{1}{4}\left[ \text{erfc}\left(\frac{a_1 c_{11} + a_2 \text{Re}\{c_{12}\}}{\sqrt{|w_{11}|^2 + |w_{12}|^2}} \sqrt{\frac{E_b}{N_0}}\right) + \text{erfc}\left(\frac{a_1 c_{11} + a_2 \text{Re}\{c_{12}\}}{\sqrt{|w_{11}|^2 + |w_{12}|^2}} \sqrt{\frac{E_b}{N_0}}\right) \right] \quad \text{(E.75)}$$

Figure 8:
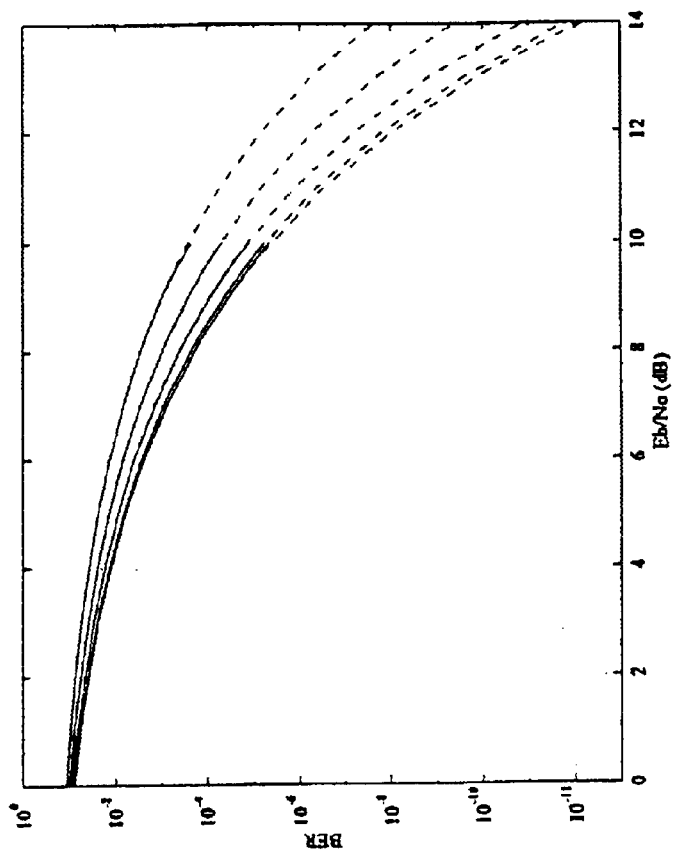
FIG. 8 is a graphical representation of the theoretical (dashed) and simulated (solid) bit error rate for a fiber optic link using binary phase shift keying with varying amounts of loss of orthogonality in accordance with FIG. 6 using a MMSE XPIC.

FIG. 8 shows plots of equation (E.75) with varying amounts of loss of orthogonality (dashed) along with monte-carlo simulation results (solid). The simulations were performed using a 128 length pseudo-random number (PN) sequence with a four symbol offset between the dual polarized bit streams. A Weiner process phase noise model was used and the resulting full width at half maximum (FWHM) line width was 2 percent of the symbol frequency. Curves are shown for received optical signals having 0, 10, 20, 30, and 40 degrees loss of orthogonality. The plots show that, like the diagonalizer XPIC, the BER performance with the MMSE XPIC is equal to that of the optimum receiver when the received signals are orthogonally polarized and the degradation from ideal performance is negligible when the loss of orthogonality is less than ten degrees. The MMSE XPIC receiver is therefore able to double the link bandwidth efficiency with almost no degradation in BER performance relative the conventional optimum receiver. Comparing the BER performance of the diagonalizer XPIC receiver shown in FIG. 7 to that of the MMSE XPIC receiver shown in FIG. 8 demonstrates that their performance is very similar, but the MMSE solution is slightly superior to the diagonalizer solution in general.

As described above, it is contemplated that frequency independent diagonalizer and MMSE XPIC solutions require that IF XPIC 670 consists of four (4) complex elements. These solutions are not unique since any practical demodulator is insensitive to a fixed or slowly varying carrier phase angle. The operations of XPIC 670 can be simplified and a unique solution obtained by factoring out the phase angle terms of the diagonal elements such that the XPIC network consists of two real elements and two complex elements. For example, referring to equation (E.25) through (E.27), if the XPIC matrix W is configured according to $$W = \begin{bmatrix} |w_{11}| & w_{12} e^{-j\psi_2} \\ w_{21} e^{-j\psi_1} & |w_{22}| \end{bmatrix} \quad \text{(E.76)}$$

then the input to demodulators 675 and 680 specified by equation (E.27) becomes $$\begin{bmatrix} i_3(t) \\ i_4(t) \end{bmatrix} = \text{Re}\left\{ \begin{bmatrix} e^{-j\psi_1} & 0 \\ 0 & e^{-j\psi_2} \end{bmatrix} \left( \begin{bmatrix} s_1(t) \\ s_2(t) \end{bmatrix} + \begin{bmatrix} n_3(t) \\ n_4(t) \end{bmatrix} \right) \right\} \quad \text{(E.77)}$$

where $\psi_1$ and $\psi_2$ are the angles of $w_{11}$ and $w_{22}$ respectively. These phase terms have no effect on the noise statistics and can be considered constant as long as the signal polarization variation and consequently the XPIC variation is slow relative to the demodulator phase tracking capability. This requirement is easily met in practice and the implementation using purely real diagonal elements therefore has identical performance to the XPIC with four complex elements.

F. Baseband XPIC Receiver Analysis

When implemented with a baseband XPIC, the receiving device may function to split the received optical signal having an electric field $\underline{e}_S(t)$ into components $\underline{e}_{Sx}(t)$ and $\underline{e}_{Sy}(t)$, which are polarized in the $\hat{x}$ and $\hat{y}$ directions, respectively. The receiving device also includes a polarization beam splitter that produces $\hat{x}$ and $\hat{y}$ polarized components from an internal local oscillator. The $\hat{x}$ and $\hat{y}$ polarized components are applied to different DBORs. Thus, the DBORs produce currents containing components from both originally transmitted signals. After removing the IF carrier and phase noise, the quadrature demodulators produce in-phase and quadrature waveforms that contain components from the in-phase and quadrature waveforms of both transmitted signals. The XPIC reconstructs the in-phase and quadrature components of the transmitted signals by complex filtering or weighting of the demodulated waveforms, and then recombining the results.

More specifically, referring now to FIG. 9, a block diagram of an exemplary implementation using a coherent receiving device and a baseband XPIC 950 is shown. The structure of receiving device 900 is identical to receiving device 600 of FIG. 6 up to the outputs of DBORs 910 and 920, and the expressions for $i_1(t)$ and $i_2(t)$ are therefore given by equations (E.15) when the XPI is frequency independent and equations (E.21) when the XPI is frequency dependent. These IF signal currents $i_1(t)$ and $i_2(t)$ are then input to ideal quadrature demodulators 930 and 940. Demodulators 930 and 940 function to multiply the complex argument of equation (E.15) by a demodulation matrix D of the form $$D = \begin{bmatrix} e^{-j(\omega_{IF} t + \phi'(t))} & 0 \\ 0 & e^{-j(\omega_{IF} t + \phi'(t))} \end{bmatrix}. \quad \text{(F.1)}$$

where $\phi'(t)$ is the received phase noise taking into account the effect of the fiber transmission medium on the transmitted phase noise $\phi(t)$. This removes the carrier and phase noise dependence from the signal waveforms, and the real portion of the resulting baseband waveforms are outputs $I'_1(t)$ and $I'_2(t)$, while the imaginary portions are outputs $Q'_1(t)$ and $Q'_2(t)$. Performing this procedure, the complex outputs from demodulators 930 and 940 are specified by $$\begin{bmatrix} z'_1(t) \\ z'_2(t) \end{bmatrix} = F^{-1}[X(\omega)] * \begin{bmatrix} v_1(t) \\ v_2(t) \end{bmatrix} + \begin{bmatrix} n_1(t) \\ n_2(t) \end{bmatrix} \quad \text{(F.2)}$$

where $z'_k(t) = z'_k(t) + jQ'_k(t)$ and the frequency response of $X(\omega)$ is now translated from IF to baseband by the frequency downconversion process of the demodulators. The statistics of the noise processes $n_1(t)$ and $n_2(t)$ are unchanged by the down conversion operation. The outputs from complex baseband XPIC 950 are now specified by $$\begin{bmatrix} z_1(t) \\ z_2(t) \end{bmatrix} = F^{-1}[W(\omega)X(\omega)] * \begin{bmatrix} v_1(t) \\ v_2(t) \end{bmatrix} + \begin{bmatrix} n_3(t) \\ n_4(t) \end{bmatrix} \quad \text{(F.3)}$$

where $n_3(t)$ and $n_4(t)$ have power spectral densities specified by equations (E.23) and (E.24) respectively.

1. Diagonalizer XPIC Signal Reconstruction

If XPIC 950 is configured according to the diagonalizer solution of equation (E.25), then XPIC 950 outputs are determined by $$\begin{bmatrix} z_1(t) \\ z_2(t) \end{bmatrix} = \begin{bmatrix} v_1(t) \\ v_2(t) \end{bmatrix} + \begin{bmatrix} n_3(t) \\ n_4(t) \end{bmatrix} \quad \text{(F.4)}$$

The four (4) outputs of XPIC 950 are the real and imaginary components of equation (F.4) and are given by $$\text{Re}\left\{\begin{bmatrix} z_1(t) \\ z_2(t) \end{bmatrix}\right\} = \begin{bmatrix} I_1(t) \\ I_2(t) \end{bmatrix} + \text{Re}\left\{\begin{bmatrix} n_3(t) \\ n_4(t) \end{bmatrix}\right\} \quad \text{(F.5)}$$

$$\text{Im}\left\{\begin{bmatrix} z_1(t) \\ z_2(t) \end{bmatrix}\right\} = \begin{bmatrix} Q_1(t) \\ Q_2(t) \end{bmatrix} + \text{Im}\left\{\begin{bmatrix} n_3(t) \\ n_4(t) \end{bmatrix}\right\} \quad \text{(F.6)}$$

The outputs of baseband XPIC 950 are therefore the desired information bearing waveforms and additive noise. Baseband XPIC 950 is, in fact, functionally equivalent to IF XPIC 670 of FIG. 6. For baseband XPIC systems, the form of the frequency dependent and frequency independent XPIC networks are the same as for the optical and IF XPIC systems and are shown in FIGS. 4A and 4B respectively. Unlike the optical and IF XPIC systems, however, for the baseband XPIC system each of the four complex filters of FIG. 4A has the form shown graphically in FIG. 10B.

For the receiver as shown in FIG. 9, the recovered baseband waveforms I(t) and Q(t) would be applied to matched filters or correlation detectors, the resulting waveforms would be sampled, and the decisions based on the resulting samples would serve as optimal estimates of the transmitted symbols. It is appreciated that sampling and analog-to-digital (A/D) conversion could precede baseband XPIC 950, and the XPIC function could be implemented by digitally processing the sampled decision variable data.

Of course, other embodiments may be employed without departing from the spirit and scope of the present invention. Although the analysis presented concentrated on PSK modulation, XPIC is equally applicable to other coherent modulation formats such as ASK, FSK, and QAM. XPIC can also be used in conjunction with frequency division multiplexing (FDM), wavelength division multiplexing (WDM), or coherent subcarrier multiplexing (SCM). The invention should, therefore, be measured in terms of the claims which follows.

What is claimed is:

1. A system comprising:
   a transmitting device to modulate orthogonally polarized optical carriers with independent information bearing waveforms; and
   a receiving device including (i) a cross polarization interference canceler that comprises a plurality of optical elements each supporting a transfer function to collectively mitigate cross polarization interference and to reconstruct the information bearing waveforms recovered from the orthogonally polarized optical carriers and (ii) a plurality of receivers each to receive an optical signal from the cross polarization interference canceler.

2. The system of claim 1 further comprising an optical fiber transmission medium coupling the transmitting device and the receiving device.

3. The system of claim 2, wherein the transmitting device includes
   a polarization beam splitter to separate a beam from a local oscillator into the orthogonally polarized optical carriers; and
   a plurality of modulators to independently modulate the orthogonally polarized optical carriers with the information bearing waveforms.

4. The system of claim 3, wherein the transmitting device further includes a polarization combiner to produce a transmit optical signal for transmission over the optical fiber transmission medium.

5. The system of claim 2, wherein the orthogonally polarized optical carriers modulated with independent information bearing waveforms and propagated through the optical fiber transmission medium constitute an incoming optical signal to the plurality of receivers.

6. The system of claim 1, wherein the receiving device further comprises a first polarization beam splitter preceding the cross polarization interference canceler, the first polarization beam splitter to separate a received optical signal field into orthogonally polarized field components.

7. The system of claim 6, wherein each of the plurality of optical elements associated with the cross polarization interference canceler of the receiving device is a complex optical elements to mitigate the non-ideal effects of the transmitter and optical fiber transmission medium on the received optical signal.

8. The system of claim 7, wherein the complex optical elements include optical filters.

9. The system of claim 6, wherein the receiving device includes a second polarization beam splitter to separate a beam from a local oscillator into a plurality of orthogonally polarized field components, a first polarized field component being routed to a first set of one or more receivers and a second polarized field component substantially orthogonal to the first polarized field component being routed to a second set of one or more receivers.

10. The system of claim 9, wherein the plurality of coherent optical receivers of the receiving device produce a plurality of electrical signals for demodulation, each of the plurality of electrical signals include significant modulation data from only one of the transmitted orthogonally polarized field components.

11. The system of claim 1, wherein each of the plurality of receivers of the receiving device is an intensity modulation direct detection receiver that receives one of the optical signals from the cross polarization interference canceler.

12. The system of claim 11, wherein the plurality of intensity modulation direct detection receivers of the receiving device are used to detect wavelength division multiplexed (WDM) signals.

13. The system of claim 1, wherein each of the plurality of receivers of the receiving device is a coherent optical receiver.

14. The system of claim 13, wherein at least one of the plurality of coherent optical receivers includes a double balanced optical receiver.

15. Implemented to receive an incoming optical signal, a receiving device comprising:
   a first polarization beam splitter to separate a received optical signal field of the incoming optical signal into orthogonally polarized components; and a cross polarization interference canceler following the first polarization beam splitter, the cross polarization interference canceler comprises a plurality of outputs and a plurality of elements each supporting a transfer function, each output of the plurality of outputs being the sum of at least two element outputs.

16. The receiving device of claim 15, wherein the first polarization beam splitter is in communication with one or more receivers being double balanced optical receivers.

17. The receiving device of claim 16 further comprising one or more demodulators each coupled to one of the double balanced optical receivers.

18. The receiving device of claim 16 further comprising a second polarization beam splitter coupled to the one or more receivers.

19. The receiving device of claim 15, wherein the cross polarization interference canceller (XPIC) is an optical XPIC.

20. The receiving device of claim 19, further comprising one or more intensity modulation direct detection (IM-DD) fiber optic receivers in communication with the XPIC.

21. The receiving device of claim 19 further comprising one or more coherent optical receivers in communications with the XPIC.

22. The receiver of claim 15 further comprising:
a local oscillator;
a second polarization beam splitter in communication with the local oscillator, the second polarization beam splitter to receive an optical signal from the local oscillator; and
one or more demodulators in communication with the cross polarization interference canceler.

23. The receiver of claim 15, wherein the cross polarization interference canceler includes a plurality of generally complex elements.

24. The receiving device of claim 15 further comprising at least two optical receivers and at least two demodulators interposed between the at least two optical receivers and the cross polarization interference canceler, the at least two demodulators to translate intermediate frequency (IF) signals into baseband signals.

25. The receiving device of claim 15, wherein the cross polarization interference canceller further mitigates polarization mode dispersion associated with the incoming optical signals.

26. A receiving device implemented to receive an incoming optical signal, a receiving device comprising:
a first polarization beam splitter to separate a received optical signal field of the incoming optical signal into orthogonally polarized components; and
a cross polarization interference canceller (XPIC) in communication with the first polarization beam splitter, the XPIC being an electrical intermediate frequency (IF) XPIC.

27. The receiving device of claim 26 further comprising a second polarization beam splitter that, along with the first polarization beam splitter, are in communication with at least two optical receivers, the at least two optical receivers to produce intermediate frequency (IF) signals transmitted to the IF XPIC.

28. The receiving device of claim 27, wherein the at least two optical receivers are coherent optical receivers.

29. The method of claim 26 further comprising:
mitigating polarization mode dispersion associated with the incoming optical signals.

30. A method comprising:
receiving an optical signal over a single fiber optic transmission medium, the optical signal being one or more polarized field components independently modulated with independent information bearing waveforms; and
processing the optical signal by (i) separating the optical field of the optical signal into orthogonally polarized field components, (ii) routing each of the orthogonally polarized field components to a coherent optical receiver to produce a first output and a second output, and (iii) transmitting the first and second outputs to a cross polarization interference canceller (XPIC).

31. The method of claim 30, wherein the cross polarization interference canceller is an intermediate frequency (IF) XPIC.

32. The method of claim 30, wherein the first and second outputs are demodulated prior to transmission to the XPIC.

33. A method comprising:
receiving an optical signal over a single fiber optic transmission medium, the optical signal being at least two polarized field components independently modulated with independent information bearing waveforms; and
mitigating cross polarization interference associated with the at least two modulated polarized field components to reconstruct the information bearing waveforms using a plurality of matrix coefficients being complex values to apply both amplitude scaling and phase shifting to the at least two modulated polarized field components.

34. The method of claim 33, wherein the mitigating of the cross polarization interference comprises:
separating an optical field of the optical signal into orthogonally polarized field components; and
processing the orthogonally polarized field components by an optical cross polarization interference canceller.

35. A method comprising:
receiving at least two optical signals with independent information bearing waveforms over a single fiber optic transmission medium, the at least two optical signals having been transmitted with generally orthogonal polarization states; and
mitigating cross polarization interference associated with the at least two optical signals to reconstruct the information bearing waveforms, mitigation of the cross polarization interference is accomplished through a matrix multiplication using a cross polarization interference canceler that produces the recovered signals with the minimum mean square error (MMSE) relative to the desired transmitted signals.

36. A method comprising:
receiving an optical signal over a single fiber optic transmission medium, the optical signal being one or more polarized field components independently modulated with independent information bearing waveforms; and
processing the optical signal by (i) separating the optical field of the optical signal into orthogonally polarized field components, (ii) processing the orthogonally polarized field components by an optical cross polarization interference canceller (XPIC), (iii) routing outputs of the optical XPIC to coherent optical receivers that convert the outputs into corresponding current outputs, and (iv) demodulating the current outputs to reconstruct baseband waveforms associated with the received optical signal.

37. A method comprising:

receiving at least two optical signals with independent information bearing waveforms over a single fiber optic transmission medium, the at least two optical signals having been transmitted with generally orthogonal polarization states; and eliminating cross polarization interference associated with the at least two optical signals to reconstruct the information bearing waveforms, the elimination of the cross polarization interference is accomplished through matrix multiplication using a diagonalizer cross polarization interference cancellation network being a general inverse of a transmission matrix associated with the transmitter and the single fiber optic transmission medium.

* * * * *